(12) United States Patent
Olson et al.

(10) Patent No.: US 11,751,507 B1
(45) Date of Patent: Sep. 12, 2023

(54) CROP HARVESTING SYSTEM WITH PLANT STRIPPING APPARATUS

(71) Applicant: HEMP PROCESSING SOLUTIONS, LLC, Harrisburg, SD (US)

(72) Inventors: Roy Olson, Sioux Falls, SD (US); Joshua Tracy, Harrisburg, SD (US); Alex Pearson, Sioux Falls, SD (US)

(73) Assignee: Hemp Processing Solutions, LLC, Harrisburg, SD (US)

( * ) Notice: Subject to any disclaimer, the term of this patent is extended or adjusted under 35 U.S.C. 154(b) by 525 days.

(21) Appl. No.: 16/934,489

(22) Filed: Jul. 21, 2020

Related U.S. Application Data

(62) Division of application No. 16/669,614, filed on Oct. 31, 2019, now Pat. No. 10,757,860.

(51) Int. Cl.
| | |
|---|---|
| *A01D 45/06* | (2006.01) |
| *A01D 45/00* | (2018.01) |
| *A01D 61/00* | (2006.01) |
| *A01D 47/00* | (2006.01) |
| *A01D 61/02* | (2006.01) |

(Continued)

(52) U.S. Cl.
CPC ........... *A01D 45/065* (2013.01); *A01D 45/00* (2013.01); *A01D 46/00* (2013.01); *A01D 47/00* (2013.01); *A01D 57/12* (2013.01); *A01D 61/008* (2013.01); *A01D 61/02* (2013.01)

(58) Field of Classification Search
CPC ...... A01D 45/00; A01D 45/065; A01D 45/06; A01D 45/16; A01D 46/00; A01D 46/005; A01D 46/02; A01D 46/04; A01D 46/08–085; A01D 46/10; A01D 46/12; A01D 46/16; A01D 46/18; A01D 46/264; A01D 46/28; A01D 46/285; A01D 47/00; A01D 57/12; A01D 61/008; A01D 61/02
See application file for complete search history.

(56) References Cited

U.S. PATENT DOCUMENTS

| | | |
|---|---|---|
| 50,712 A | 10/1865 | Hugunin |
| 254,974 A | 3/1882 | Hollingsworth |
| 288,743 A | 11/1883 | Swingle |

(Continued)

FOREIGN PATENT DOCUMENTS

| | | |
|---|---|---|
| CA | 2124250 | 11/1995 |
| CA | 2665876 | 11/2010 |

(Continued)

OTHER PUBLICATIONS

Charles Stark and Julie Kalivoda, "Evaluating Particle Size of Feedstuffs", publication, Nov. 2016, 4 pages, K-State Research and Extension, Kansas State University Agricultural Experiment Station and Cooperative Extension Services, Manhattan, Kansas.

(Continued)

*Primary Examiner* — Adam J Behrens
(74) *Attorney, Agent, or Firm* — Jeffrey A. Proehl; Woods, Fuller, Shultz & Smith, PC

(57) ABSTRACT

A system for removing parts from plants rooted in an agricultural field while leaving other parts of the plants rooted in the agricultural field may include a harvester apparatus with an intake throat formed by structures such as the combination of an infeed head and infeed conveyor, a pair of stripping assemblies including stripping belts, or stripping assemblies including stripping members such as chains.

19 Claims, 17 Drawing Sheets

(51) Int. Cl.
*A01D 57/12* (2006.01)
*A01D 46/00* (2006.01)

(56) References Cited

U.S. PATENT DOCUMENTS

| | | | |
|---|---|---|---|
| 417,836 A | 12/1889 | Ponsar | |
| 454,950 A | 6/1891 | Sewell | |
| 473,957 A | 5/1892 | Pollock | |
| 621,744 A | 3/1899 | Bowden | |
| 664,836 A | 1/1901 | Davidson | |
| 738,166 A | 9/1903 | Davidson | |
| 744,567 A | 11/1903 | Krusemark | |
| 1,390,693 A | 9/1921 | Fernandez | |
| 1,403,262 A * | 1/1922 | Magill | A01D 45/06 171/69 |
| 1,466,508 A | 8/1923 | Lake | |
| 1,568,267 A | 1/1926 | Carter | |
| 1,611,675 A | 12/1926 | Prestemon | |
| 1,678,134 A | 7/1928 | Cromer | |
| 1,763,646 A * | 6/1930 | Callahan | A01D 46/12 56/49 |
| 1,940,531 A | 12/1933 | Bullock | |
| 2,053,038 A | 9/1936 | Mackenzie | |
| 2,118,010 A | 5/1938 | Hazle, Jr. | |
| 2,202,892 A | 6/1940 | Berry | |
| 2,447,122 A * | 8/1948 | Horst, Jr. | A01D 46/02 56/130 |
| 2,608,973 A | 9/1952 | Coons | |
| 2,614,597 A | 10/1952 | Magnus | |
| 2,689,439 A * | 9/1954 | Martin | A01D 46/10 56/13.2 |
| 2,887,276 A | 5/1959 | Minarik | |
| 3,226,041 A | 12/1965 | Graumann | |
| 3,261,152 A * | 7/1966 | Johnson | A01D 51/002 56/328.1 |
| 3,304,355 A | 2/1967 | Pobst, Jr. | |
| 3,321,079 A | 5/1967 | Sackett | |
| 3,362,649 A | 1/1968 | Odden | |
| 3,419,168 A * | 12/1968 | Isbell | A01D 46/082 406/170 |
| 3,422,751 A * | 1/1969 | Hubbard | A01D 46/084 100/295 |
| 3,491,952 A | 1/1970 | Krolopp | |
| 3,518,818 A * | 7/1970 | Porter | A01D 46/00 56/327.1 |
| 3,568,419 A * | 3/1971 | Creager | A01D 45/00 56/126 |
| 3,633,831 A | 1/1972 | Marengo | |
| 3,651,625 A * | 3/1972 | Redford | A01D 45/22 56/128 |
| 3,683,559 A | 8/1972 | Kalwaites | |
| RE27,715 E * | 7/1973 | Porter | A01D 45/008 56/327.1 |
| 3,752,315 A | 8/1973 | Hubach | |
| 3,855,760 A * | 12/1974 | Smith, Jr. | A01D 45/00 56/13.2 |
| 3,862,721 A | 1/1975 | Flair | |
| 3,866,842 A | 2/1975 | Linzberger | |
| 4,083,501 A | 4/1978 | Ryan | |
| 4,088,273 A | 5/1978 | Jakobs | |
| 4,165,280 A | 8/1979 | Holley | |
| 4,177,900 A | 12/1979 | Kluthe | |
| 4,200,242 A | 4/1980 | Jeda | |
| 4,202,629 A | 5/1980 | Jakobs | |
| 4,213,855 A | 7/1980 | Vonbennigsen-Mackiewicz | |
| 4,218,414 A | 8/1980 | Hagg | |
| 4,276,738 A * | 7/1981 | Ferraro | A01D 46/02 56/130 |
| 4,361,476 A | 11/1982 | Brewer | |
| 4,387,552 A | 6/1983 | Lancaster | |
| 4,442,876 A | 4/1984 | Koike | |
| 4,468,265 A | 8/1984 | Maclaughlin | |
| 4,499,712 A | 2/1985 | Klinner | |
| 4,561,156 A | 12/1985 | Sun | |
| 4,572,216 A | 2/1986 | Josuttis | |
| 4,587,799 A | 5/1986 | Thomas | |
| 4,608,007 A | 8/1986 | Wood | |
| 4,608,156 A | 8/1986 | Reddish | |
| 4,609,158 A | 9/1986 | Wilson | |
| 4,617,709 A | 10/1986 | Gundlach | |
| 4,645,484 A | 2/1987 | Niske | |
| 4,650,129 A | 3/1987 | Newell | |
| 4,720,207 A | 1/1988 | Salani | |
| 4,786,001 A | 11/1988 | Ephraim | |
| 4,843,806 A | 7/1989 | Klinner | |
| 4,848,681 A | 7/1989 | Erikkson | |
| 4,856,428 A | 8/1989 | Green | |
| 4,862,570 A | 9/1989 | Bald | |
| 4,886,218 A | 12/1989 | Bradley | |
| 4,896,486 A * | 1/1990 | Lundahl | A01F 12/444 56/DIG. 15 |
| 4,941,290 A | 7/1990 | Holyoke | |
| 4,951,451 A | 8/1990 | Klinner | |
| 4,965,993 A * | 10/1990 | Butler | A01D 45/008 198/510.1 |
| 4,974,772 A | 12/1990 | Spurrell et al. | |
| 4,986,997 A | 1/1991 | Posner | |
| 5,000,392 A | 3/1991 | Kastingschafer | |
| 5,036,653 A | 8/1991 | Klinner | |
| 5,042,728 A | 8/1991 | Haque | |
| 5,044,115 A | 9/1991 | Richardson | |
| 5,044,147 A | 9/1991 | Klinner | |
| 5,052,088 A | 10/1991 | Hagewood | |
| 5,100,062 A | 3/1992 | Baltensperger | |
| 5,115,984 A | 5/1992 | Satake | |
| 5,185,991 A | 2/1993 | Klinner | |
| 5,192,028 A | 3/1993 | Curran | |
| 5,201,470 A | 4/1993 | Baltensperger | |
| 5,213,273 A | 5/1993 | Linnerz | |
| 5,247,717 A | 9/1993 | Smith | |
| 5,251,144 A | 10/1993 | Ramamurthi | |
| 5,253,816 A | 10/1993 | Kastingschafer | |
| 5,287,687 A * | 2/1994 | Urich | A01D 46/00 56/328.1 |
| 5,315,789 A | 5/1994 | Takashi | |
| 5,366,167 A | 11/1994 | Mccarthy | |
| 5,392,998 A | 2/1995 | Suessegger | |
| 5,419,107 A | 5/1995 | Shelbourne | |
| 5,428,946 A * | 7/1995 | Hansen | A01D 45/16 56/14.3 |
| 5,501,629 A | 3/1996 | Kawana | |
| 5,523,701 A | 6/1996 | Smith | |
| 5,533,371 A | 7/1996 | Frischknecht | |
| 5,536,073 A | 7/1996 | Sulosky | |
| 5,547,136 A | 8/1996 | Steffens | |
| 5,597,125 A | 1/1997 | Bouldin | |
| 5,622,323 A | 4/1997 | Krueger | |
| 5,632,135 A | 5/1997 | Baker, IV | |
| 5,663,512 A | 9/1997 | Schader | |
| 5,678,777 A | 10/1997 | Satake | |
| 5,700,179 A | 12/1997 | Hasegawa | |
| 5,717,209 A | 2/1998 | Bigman | |
| 5,745,947 A * | 5/1998 | Liu | E01H 1/106 15/82 |
| 5,846,129 A | 12/1998 | Dragt | |
| 5,850,656 A * | 12/1998 | Smith | E01H 1/047 56/364 |
| 6,016,626 A | 1/2000 | Auer | |
| 6,036,127 A | 3/2000 | Moller | |
| 6,142,923 A | 11/2000 | Bakoledis | |
| 6,145,767 A | 11/2000 | Hostettler | |
| 6,176,683 B1 | 1/2001 | Yang | |
| 6,199,777 B1 | 3/2001 | Satake | |
| 6,258,308 B1 | 7/2001 | Brady | |
| 6,293,478 B1 | 9/2001 | Livrieri | |
| 6,315,659 B1 | 11/2001 | Shelbourne | |
| 6,338,236 B1 | 1/2002 | Rodriguez | |
| 6,365,416 B1 | 4/2002 | Elsohly | |
| 6,372,281 B1 | 4/2002 | Metzger | |
| 6,375,104 B1 | 4/2002 | Hruska | |
| 6,443,376 B1 | 9/2002 | Huang | |
| 6,517,016 B1 | 2/2003 | Feige | |
| 6,589,598 B2 | 7/2003 | Ochiai | |

(56) References Cited

U.S. PATENT DOCUMENTS

| | | | |
|---|---|---|---|
| 6,615,936 B1 | 9/2003 | Mourik | |
| 6,634,577 B2 | 10/2003 | Horigane | |
| 6,730,519 B2 | 5/2004 | Elsohly | |
| 6,779,329 B2 * | 8/2004 | Yoder | A01D 46/00 56/330 |
| 6,886,763 B2 | 5/2005 | Lepage | |
| 6,990,431 B2 | 1/2006 | Beaudoin | |
| 7,006,953 B2 | 2/2006 | Takemura | |
| 7,032,850 B2 | 4/2006 | Fukui | |
| 7,083,544 B2 | 8/2006 | Goransson | |
| 7,170,251 B2 | 1/2007 | Huang | |
| 7,183,735 B2 | 2/2007 | Heinemann | |
| 7,198,215 B2 | 4/2007 | Everson | |
| 7,206,719 B2 | 4/2007 | Lindsay | |
| 7,285,180 B2 | 10/2007 | Sicley | |
| 7,381,017 B2 | 6/2008 | Wang | |
| 7,419,694 B2 | 9/2008 | Korolchuk | |
| 7,425,344 B2 | 9/2008 | Korolchuk | |
| 7,540,697 B2 | 1/2009 | Wang | |
| 7,568,641 B2 | 8/2009 | Dreimann | |
| 7,592,468 B2 | 9/2009 | Goodwin | |
| 7,756,678 B2 | 7/2010 | Bonissone | |
| 7,757,980 B2 | 7/2010 | Oare | |
| 7,832,241 B2 | 11/2010 | Mantovan | |
| 8,016,220 B2 | 9/2011 | Melo | |
| 8,144,005 B2 | 3/2012 | Hu | |
| 8,162,243 B2 | 4/2012 | Wenthe | |
| 8,206,061 B1 | 6/2012 | Hansen | |
| 8,211,341 B2 | 7/2012 | Lustiger | |
| 8,292,207 B2 | 10/2012 | Fard | |
| 8,343,553 B2 | 1/2013 | Hospodor | |
| 8,485,052 B2 | 7/2013 | Gebhart | |
| 8,690,087 B2 | 4/2014 | Holl | |
| 8,734,143 B2 | 5/2014 | Morris | |
| 8,758,843 B1 | 6/2014 | Hillyer | |
| 8,806,844 B2 | 8/2014 | Miller | |
| 8,842,267 B2 | 9/2014 | Heine | |
| 8,851,408 B2 | 10/2014 | Bihn | |
| 9,066,910 B2 | 6/2015 | Rosenblatt | |
| 9,067,210 B2 | 6/2015 | Bat | |
| 9,104,650 B2 | 8/2015 | Hosek | |
| 9,273,786 B2 | 3/2016 | Hodebourg et al. | |
| 9,510,507 B1 | 12/2016 | Abbott | |
| 9,592,457 B2 | 3/2017 | Dabao | |
| 9,604,226 B2 | 3/2017 | Storm | |
| 9,649,349 B1 | 5/2017 | Tucker | |
| 9,651,467 B2 | 5/2017 | Deguchi | |
| 9,694,040 B2 | 7/2017 | Scialdone | |
| 9,744,200 B1 | 8/2017 | Tucker | |
| 9,744,737 B2 | 8/2017 | Habermann | |
| 9,788,770 B1 | 10/2017 | Belthangady | |
| 9,795,338 B2 | 10/2017 | Kang | |
| 9,797,822 B2 | 10/2017 | Little, III | |
| 9,801,956 B2 | 10/2017 | Kularatne | |
| 9,803,063 B2 | 10/2017 | Reddy | |
| 9,804,092 B2 | 10/2017 | Zeng | |
| 9,808,538 B2 | 11/2017 | Kularatne | |
| 9,919,315 B2 | 3/2018 | Pearson | |
| 9,959,514 B2 | 5/2018 | Phan | |
| 9,974,821 B2 | 5/2018 | Kennedy | |
| 10,143,706 B2 | 12/2018 | Kotra | |
| 10,322,487 B1 | 6/2019 | Hansen | |
| 10,399,082 B1 | 9/2019 | Pearson | |
| 10,473,585 B2 | 11/2019 | Coffey | |
| 10,524,423 B1 | 1/2020 | Olson | |
| 10,736,267 B2 * | 8/2020 | McCracken | A01D 43/086 |
| 10,751,722 B1 | 8/2020 | Pearson | |
| 10,757,860 B1 | 9/2020 | Olson | |
| 10,785,906 B2 | 9/2020 | Olson | |
| 10,807,098 B1 | 10/2020 | Sandnes | |
| 2001/0006013 A1 | 7/2001 | Nobauer | |
| 2002/0022899 A1 | 2/2002 | Dehy | |
| 2002/0069633 A1 * | 6/2002 | Yoder | A01D 45/00 56/328.1 |
| 2002/0168911 A1 | 11/2002 | Tonner | |
| 2002/0175055 A1 | 11/2002 | Ryde | |
| 2003/0017426 A1 | 1/2003 | Schmidt | |
| 2004/0096585 A1 | 5/2004 | Bonnebat | |
| 2005/0188668 A1 | 9/2005 | Geraghty | |
| 2006/0073258 A1 | 4/2006 | Korolchuk | |
| 2006/0207862 A1 | 9/2006 | Costanzo | |
| 2006/0231021 A1 | 10/2006 | Friske | |
| 2007/0170291 A1 | 7/2007 | Naganawa | |
| 2007/0209347 A1 | 9/2007 | Malmros | |
| 2007/0241218 A1 | 10/2007 | Peterson | |
| 2007/0294121 A1 | 12/2007 | Galt | |
| 2008/0063330 A1 | 3/2008 | Orlowski | |
| 2008/0167483 A1 | 7/2008 | Whittle | |
| 2008/0191075 A1 | 8/2008 | Bon | |
| 2008/0203956 A1 | 8/2008 | Cohen | |
| 2008/0275660 A1 | 11/2008 | Bhateja | |
| 2009/0093191 A1 | 4/2009 | Glide | |
| 2009/0293440 A1 * | 12/2009 | Moreira | A01D 45/22 460/115 |
| 2009/0294558 A1 | 12/2009 | Bihn | |
| 2009/0295561 A1 | 12/2009 | Hu | |
| 2010/0030926 A1 | 2/2010 | Boussy | |
| 2010/0059609 A1 | 3/2010 | Teeter | |
| 2010/0127217 A1 | 5/2010 | Lightowlers | |
| 2011/0067374 A1 | 3/2011 | James | |
| 2011/0113740 A1 | 5/2011 | Desmarais | |
| 2011/0276828 A1 | 11/2011 | Tamaki | |
| 2012/0005107 A1 | 1/2012 | Lowden | |
| 2012/0046352 A1 | 2/2012 | Hospodor | |
| 2012/0107475 A1 | 5/2012 | Kolb | |
| 2012/0244266 A1 | 9/2012 | Ku | |
| 2013/0087644 A1 | 4/2013 | Ephraim | |
| 2013/0271110 A1 | 10/2013 | Yamanaka | |
| 2013/0301375 A1 | 11/2013 | Stephan | |
| 2014/0014748 A1 | 1/2014 | Zeeck | |
| 2014/0048459 A1 | 2/2014 | Hafford | |
| 2014/0145018 A1 | 5/2014 | Niklewski | |
| 2014/0166797 A1 | 6/2014 | Den Boer | |
| 2014/0245799 A1 | 9/2014 | Kim | |
| 2014/0252141 A1 | 9/2014 | Weinmann | |
| 2014/0299688 A1 | 10/2014 | Carbonini | |
| 2015/0001323 A1 | 1/2015 | Rikkonen | |
| 2015/0027096 A1 | 1/2015 | Black | |
| 2015/0028139 A1 | 1/2015 | Bihn | |
| 2015/0129698 A1 | 5/2015 | Olson | |
| 2015/0156967 A1 | 6/2015 | Steenland | |
| 2015/0211971 A1 | 7/2015 | Little, III | |
| 2015/0217295 A1 | 8/2015 | Niklewski | |
| 2015/0224509 A1 | 8/2015 | Serrano | |
| 2015/0300800 A1 | 10/2015 | Van Valkenburgh | |
| 2015/0324759 A1 | 11/2015 | Bansal | |
| 2015/0346717 A1 | 12/2015 | Hosek | |
| 2016/0100524 A1 | 4/2016 | Young | |
| 2016/0120123 A1 | 5/2016 | Brummelhuis | |
| 2016/0245588 A1 | 8/2016 | Baugh | |
| 2016/0263580 A1 | 9/2016 | Rhea | |
| 2016/0374386 A1 | 12/2016 | Desmarais | |
| 2017/0021357 A1 | 1/2017 | Birtch | |
| 2017/0027105 A1 | 2/2017 | Wenger | |
| 2017/0043347 A1 | 2/2017 | Berglund | |
| 2017/0080466 A1 | 3/2017 | Godwin | |
| 2017/0131194 A1 | 5/2017 | Little, III | |
| 2017/0136468 A1 | 5/2017 | Barber | |
| 2017/0246640 A1 | 8/2017 | Wagner | |
| 2017/0333257 A1 | 11/2017 | Schmitz | |
| 2017/0333809 A1 | 11/2017 | Lopa | |
| 2018/0021786 A1 | 1/2018 | Fischer | |
| 2018/0035610 A1 | 2/2018 | Wieker | |
| 2018/0116117 A1 | 5/2018 | Lutz | |
| 2018/0126578 A1 | 5/2018 | Raichart | |
| 2018/0199511 A1 | 7/2018 | Horning, Jr. | |
| 2018/0213722 A1 | 8/2018 | Pratt | |
| 2018/0259446 A1 | 9/2018 | Coffey | |
| 2018/0338516 A1 | 11/2018 | Jagadevan | |
| 2019/0119802 A1 | 4/2019 | Suidzu | |
| 2019/0124840 A1 | 5/2019 | Bates | |
| 2019/0276420 A1 | 9/2019 | Cho | |

(56) References Cited

U.S. PATENT DOCUMENTS

| | | | |
|---|---|---|---|
| 2020/0214207 A1* | 7/2020 | McCracken | A01D 45/065 |
| 2020/0368755 A1 | 11/2020 | Graber | |
| 2021/0100167 A1* | 4/2021 | Zuzga | A01D 45/065 |

FOREIGN PATENT DOCUMENTS

| | | | |
|---|---|---|---|
| CA | 3012914 | 10/2018 | |
| CN | 201702458 | 1/2011 | |
| CN | 201720507 | 1/2011 | |
| CN | 201799709 | 4/2011 | |
| CN | 101401506 | 6/2012 | |
| CN | 202873360 | 4/2013 | |
| CN | 202921355 | 5/2013 | |
| CN | 103430692 | 12/2013 | |
| CN | 103497823 | 1/2014 | |
| CN | 104194920 | 12/2014 | |
| CN | 204907202 | 12/2015 | |
| CN | 205030140 | 2/2016 | |
| CN | 105594370 | 5/2016 | |
| CN | 206690229 | 12/2017 | |
| CN | 108064545 | 5/2018 | |
| CN | 108076804 | 5/2018 | |
| CN | 207385669 | 5/2018 | |
| CN | 108624394 | 10/2018 | |
| CN | 108718676 | 11/2018 | |
| CN | 108811715 | 11/2018 | |
| CN | 108633454 | 12/2018 | |
| CN | 108941548 | 12/2018 | |
| CN | 109363026 | 2/2019 | |
| CN | 109576578 | 4/2019 | |
| DE | 2737115 | 3/1979 | |
| DE | 2807634 | 8/1979 | |
| DE | 3717610 | 3/1988 | |
| DE | 4120456 | 12/1992 | |
| DE | 19627137 | 1/1998 | |
| DE | 102005055373 | 5/2007 | |
| EP | 0383410 | 8/1990 | |
| EP | 1195668 | 9/2002 | |
| EP | 1757181 | 2/2007 | |
| EP | 1757181 A1 * | 2/2007 | A01D 41/08 |
| EP | 2556740 | 2/2013 | |
| FR | 2885009 | 11/2006 | |
| GB | 736092 | 8/1955 | |
| GB | 973177 | 10/1964 | |
| JP | 2010201440 | 9/2010 | |
| RU | 2119737 | 10/1998 | |
| WO | 9419970 | 9/1994 | |
| WO | 0000012 | 1/2000 | |
| WO | 2005119089 | 12/2005 | |
| WO | 2007066847 | 6/2007 | |
| WO | 2007133098 | 11/2007 | |
| WO | 2009128711 | 10/2009 | |
| WO | 2010082322 | 7/2010 | |
| WO | 2010130035 | 11/2010 | |
| WO | 2013160576 | 10/2013 | |
| WO | 2017051398 | 3/2017 | |
| WO | 2018014135 | 1/2018 | |
| WO | 2019041017 | 3/2019 | |
| WO | 2019119153 | 6/2019 | |
| WO | 2019157783 | 8/2019 | |

OTHER PUBLICATIONS

Revolutionary Hemp Harvester, "Introducing the Revolutionary Hemp Harvester", 11 pages, https://revolutionaryhempharvester.com, download date Nov. 21, 2019.

RHHE, LLC, "Revolutionary Hemp Harvester", Equipment Story, 2 pages, https://revolutionaryhempharvester.com, download date Nov. 15, 2019.

RHHE, LLC, "Revolutionary Hemp Harvester", Inventor Story, 2 pages, https://revolutionaryhempharvester.com, download date Nov. 15, 2019.

Chris Crowell, "Are you brewer enough to face the T-REX by Ziemann at CBC 2016?", Apr. 25, 2016, webpage https://www.craftbrewingbusiness.com/equipment-systems/, download date Dec. 10, 2019, 8 pages, CBB Media, LLC.

* cited by examiner

CROP HARVESTING SYSTEM WITH PLANT STRIPPING APPARATUS

REFERENCE TO RELATED APPLICATIONS

This application is a divisional of U.S. patent application Ser. No. 16/669,614, filed Oct. 31, 2019, which is hereby incorporated by reference in its entirety.

BACKGROUND

Field

The present disclosure relates to crop harvesters and more particularly pertains to a new crop harvesting system capable of removing parts from a plant rooted in an agricultural field while leaving other parts of the plant rooted in the field.

SUMMARY

In one aspect, the present disclosure relates to a system for removing parts from plants rooted in an agricultural field while leaving other parts of the plants rooted in the agricultural field. The system may comprise a harvester apparatus having a front and a rear, and may be configured to receive a plant into an intake throat toward the front of the harvester apparatus. The harvester apparatus may comprise a harvester frame having a forward end toward the front of the harvester apparatus and a rearward end toward the rear of the harvester apparatus, and a harvester housing mounted on the harvester frame and defining an interior of the harvester apparatus.

The harvester apparatus may also include an infeed head being rotatably mounted on the harvester frame toward the front of the harvester apparatus and forming a portion of the intake throat, and the infeed head may include a drum having an infeed head surface thereon and a plurality of fingers extending outwardly from the infeed head surface. The harvester apparatus may also include an infeed conveyor being spaced from the infeed head by a gap forming a portion of the intake throat, with the infeed conveyor including an infeed belt having an outer surface and a plurality of fingers extending outwardly from the outer surface of the infeed belt. A portion of the fingers on the infeed head and on the belt may extend into the gap forming the infeed throat to strip plant parts from the plants rooted in the agricultural field.

In another aspect, the disclosure may relate to a system for removing parts from plants rooted in an agricultural field while leaving other parts of the plants rooted in the agricultural field. The system may comprise a harvester apparatus having a front and a rear and a top and a bottom, and may be configured to receive a plant into an intake throat toward the front of the harvester apparatus. The harvester apparatus may define a plant path through the harvester apparatus extending rearwardly from the intake throat, and may comprise a harvester frame having a forward end toward the front of the harvester apparatus and a rearward end toward the rear of the harvester apparatus, with the harvester frame including a mounting structure configured to mount on a vehicle and a pair of support structures mounted on the mounting structure. The harvester apparatus may also include a harvester housing mounted on the harvester frame and defining an interior of the harvester apparatus, and defining a forward opening generally corresponding to the intake throat through which a rooted plant passes into the interior of the housing and a rearward opening through which the rooted plant passes out of the interior of the housing. The harvester housing may have a lower slot through which a portion of the rooted plant passes through as the plant moves into the interior through the forward opening and out of the interior through the rearward opening. The harvester housing may include a pair of housing shells oriented in an opposing relationship, each of the housing shells defining a portion of the housing interior, with the plant path being defined between the housing shells, each of the housing shells having an inward opening such that the inward openings of the shells are positioned in opposition to each other. The harvester apparatus may further include a pair of stripping assemblies mounted on the harvester frame, and the stripping assemblies being at least partially positioned in the interior of the harvester housing with each of the stripping assemblies being mounted on a respective one of the support structures of the harvester frame and being associated with a respective one of the housing shells. Each stripping assembly may comprise a stripping belt positioned on a side of the plant path such that outer surfaces of the stripping belts of the stripping assemblies are oriented in an opposing relationship across the plant path, and a plurality of fingers extending outwardly from the outer surface of the stripping belt. A portion of the fingers on each of the stripping belts of the stripping assemblies may extend into the plant path of the harvester apparatus.

In yet another aspect, the present disclosure relates to a system for removing parts from plants rooted in an agricultural field while leaving other parts of the plants rooted in the agricultural field. The system may comprise a harvester apparatus having a front and a rear and a top and a bottom, and may be configured to receive a plant into an intake throat toward the front of the harvester apparatus. The harvester apparatus may define a plant path through the harvester apparatus extending rearwardly from the intake throat. The harvester apparatus may comprise a harvester frame having a forward end toward the front of the harvester apparatus and a rearward end toward the rear of the harvester apparatus, and may include a mounting structure configured to mount on a vehicle and a pair of support structures mounted on the mounting structure. The harvester apparatus may include a harvester housing mounted on the harvester frame and defining an interior of the harvester apparatus, with the harvester housing being divided into two sections located on opposite sides of the intake throat and the plant path of the harvester apparatus. The harvester apparatus may also include a pair of stripping assemblies with each stripping assembly being mounted on one of the support structures of the harvester frame and being associated with one of the housing sections of the harvester housing, and each stripping assembly comprising a flexible stripping member positioned on a side of the plant path. The stripping members each may have an active extent positioned along opposite sides of the plant path such that the active extents of the stripping members are oriented in an opposing relationship along the plant path to contact plants moving along the plant path.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
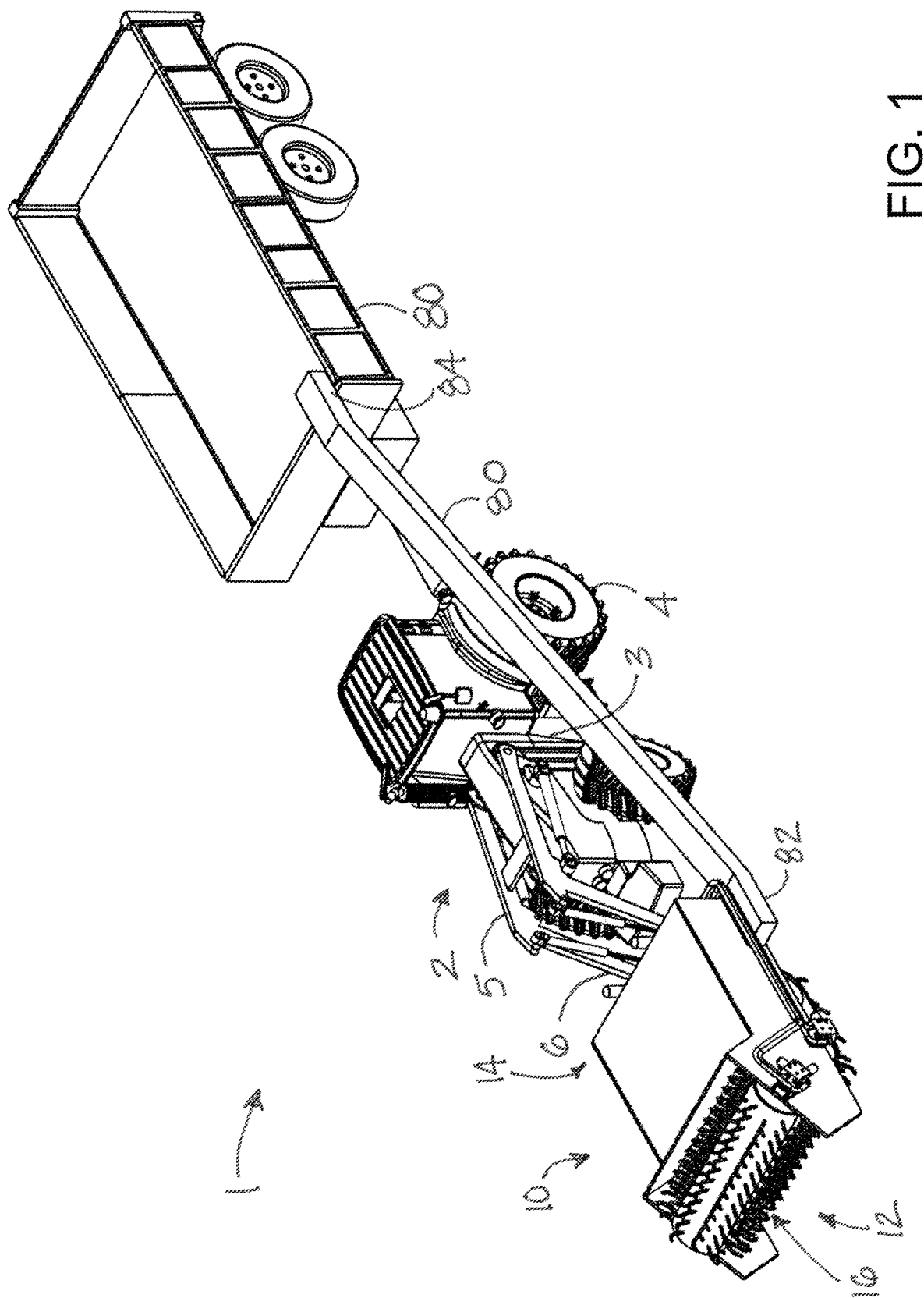
FIG. 1 is a schematic perspective view of a new crop harvesting system with an embodiment of a harvester apparatus, according to the present disclosure.
Figure 2:
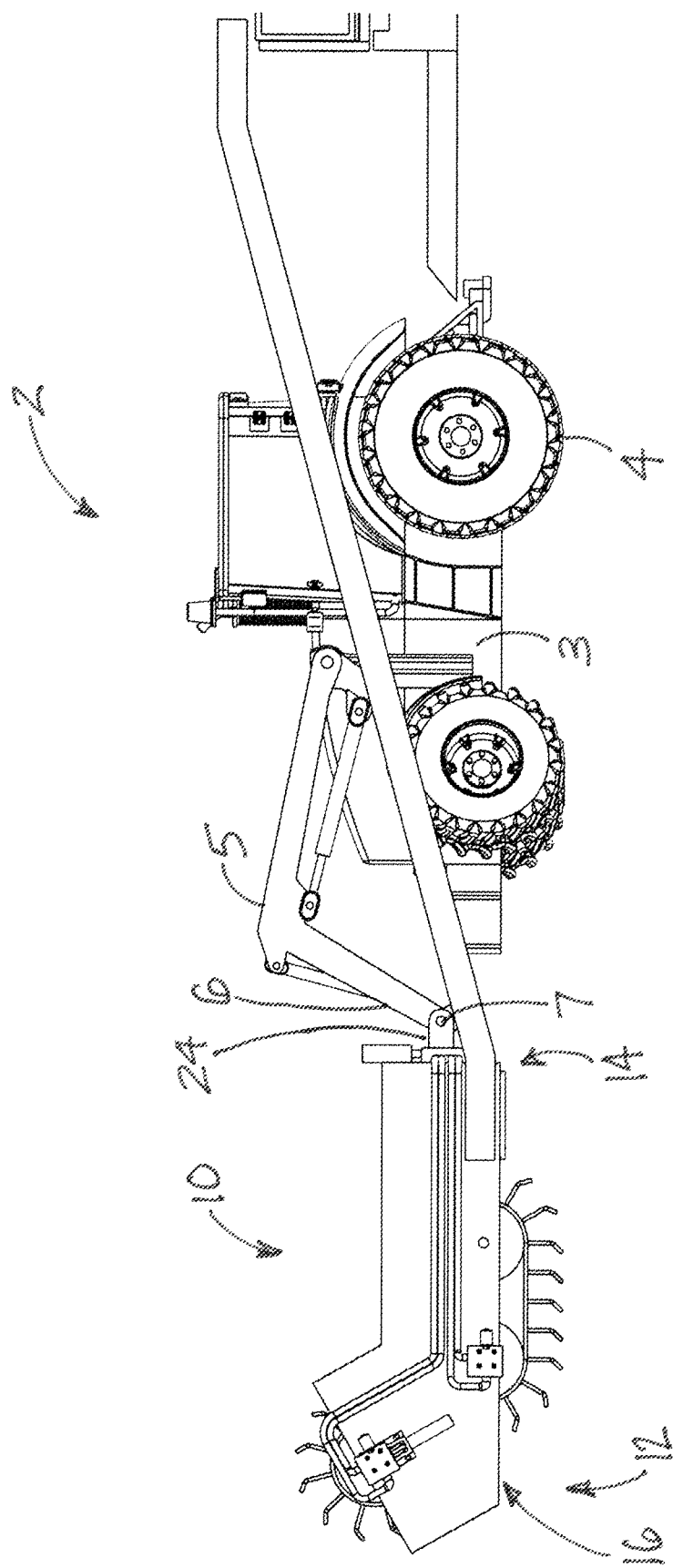
FIG. 2 is a schematic side view of the system with the embodiment of the crop harvesting system of FIG. 1, according to the present disclosure.
Figure 3:
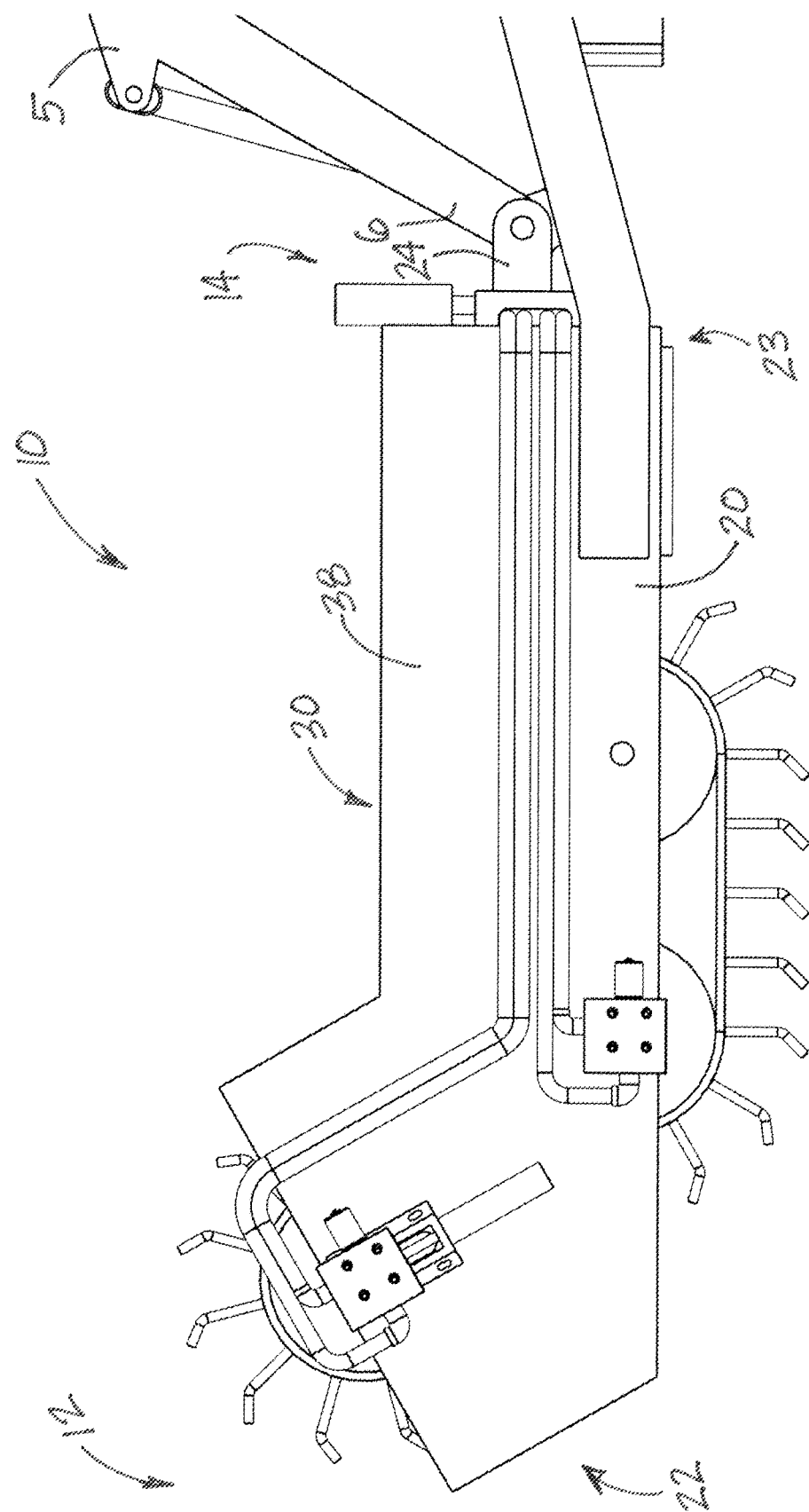
FIG. 3 is a schematic side view of the embodiment of the harvester apparatus of FIG. 1, according to the present disclosure.
Figure 4:
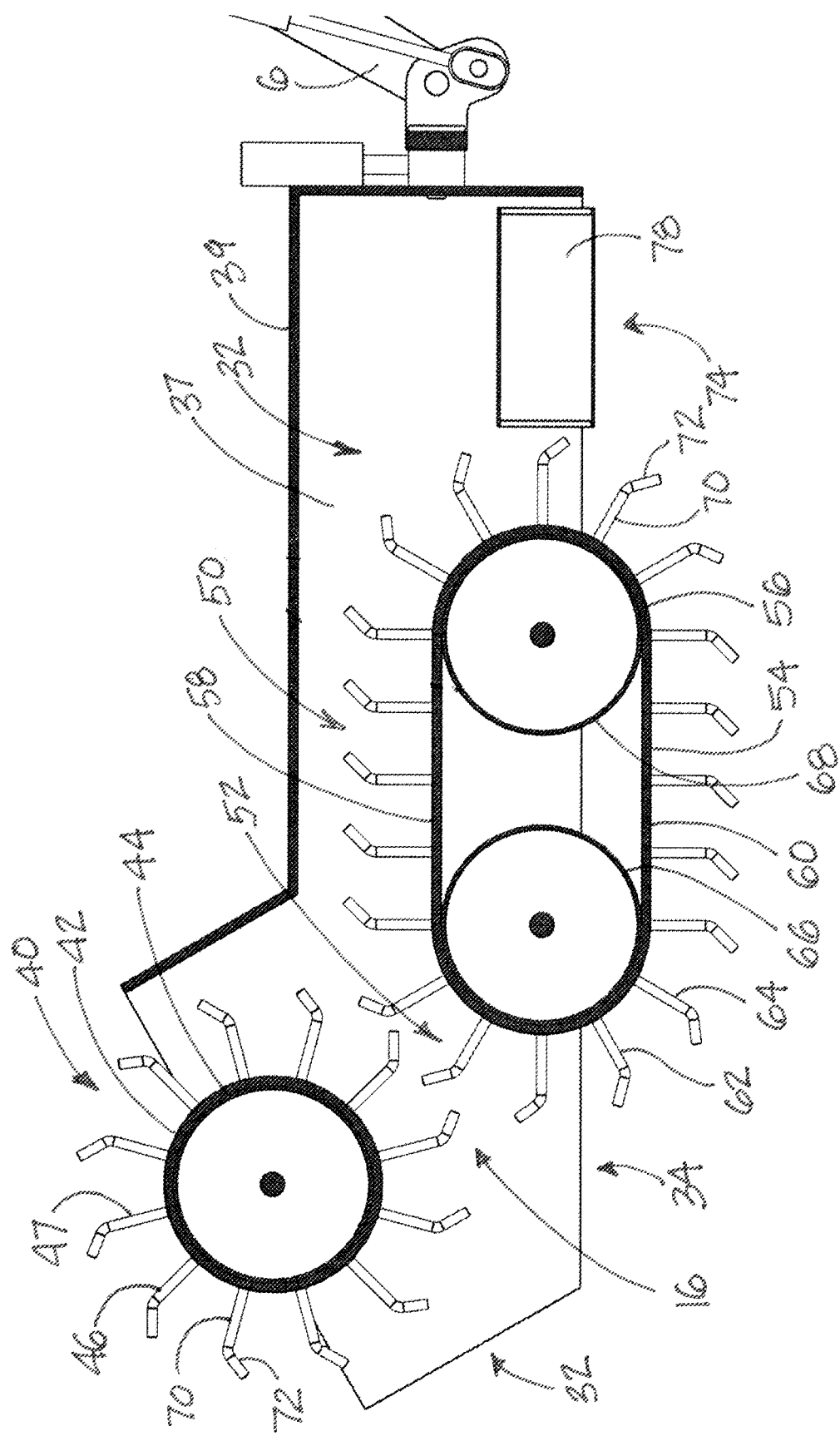
FIG. 4 is a schematic side sectional view of the embodiment of the harvester apparatus of FIG. 1, according to an illustrative embodiment.
Figure 5:
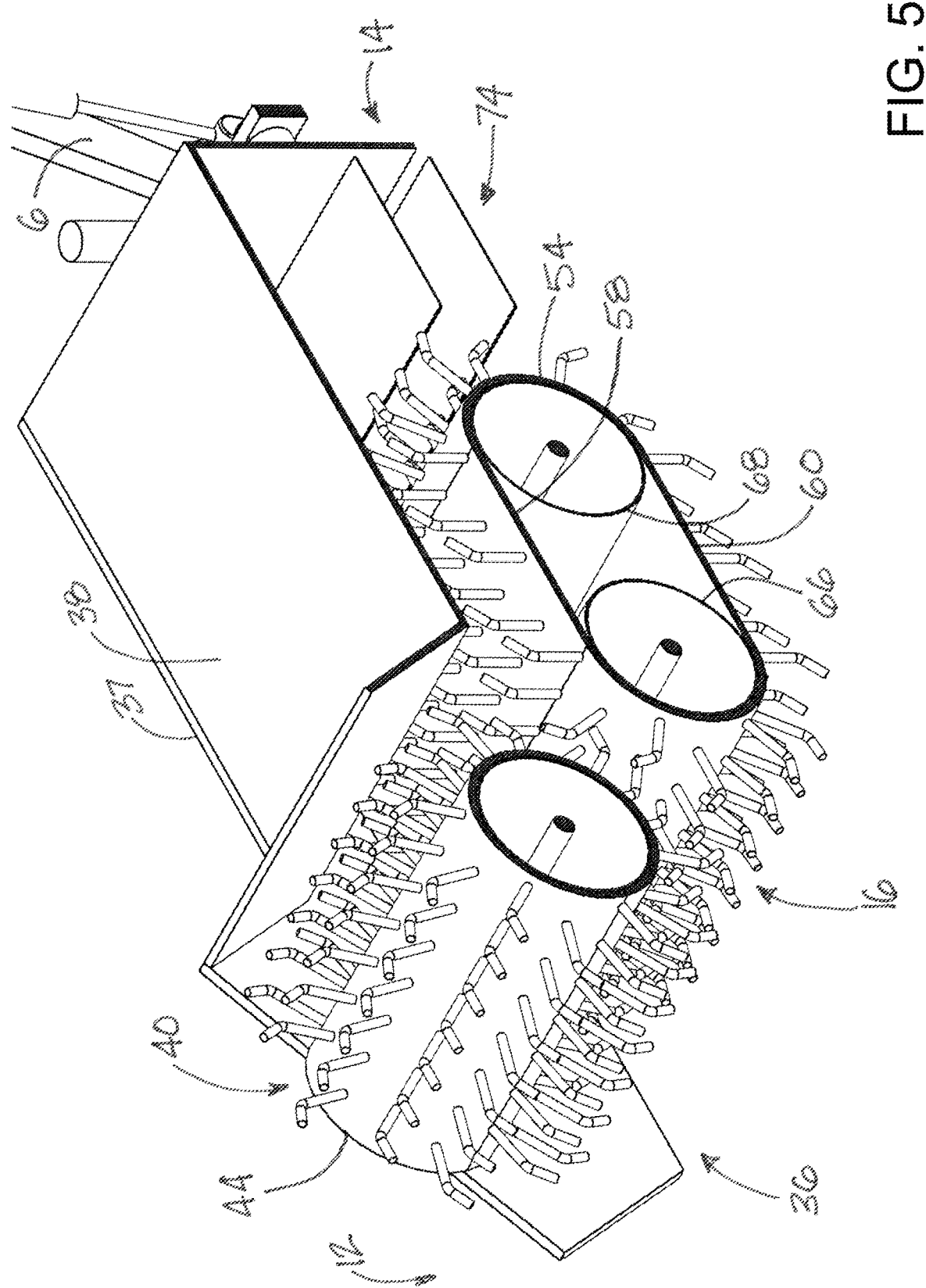
FIG. 5 is a schematic upper perspective sectional view of the embodiment of the harvester apparatus of FIG. 1, according to an illustrative embodiment.
Figure 6:
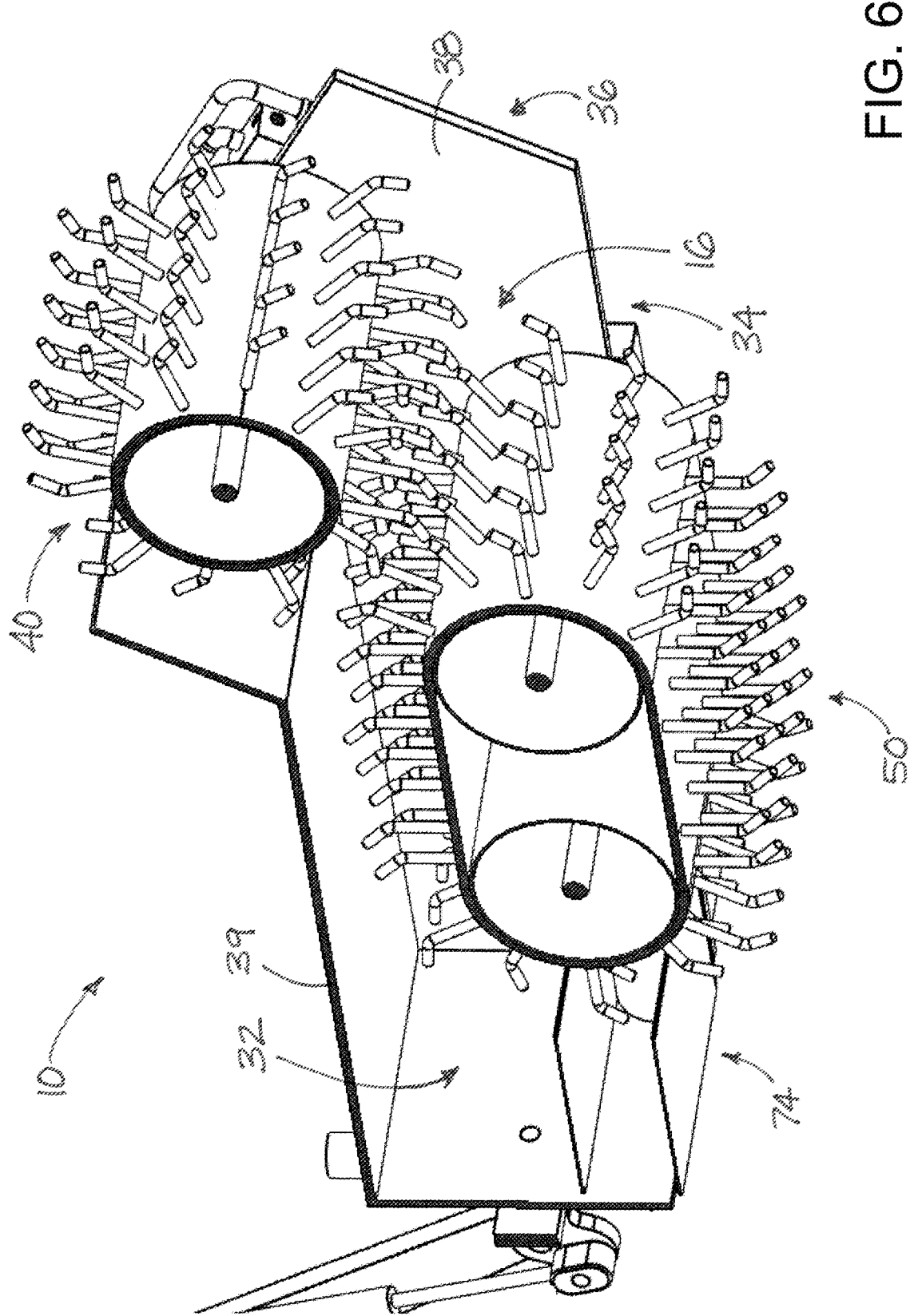
FIG. 6 is a schematic lower perspective sectional view of the embodiment of the harvester apparatus of FIG. 1, according to an illustrative embodiment.
Figure 7:
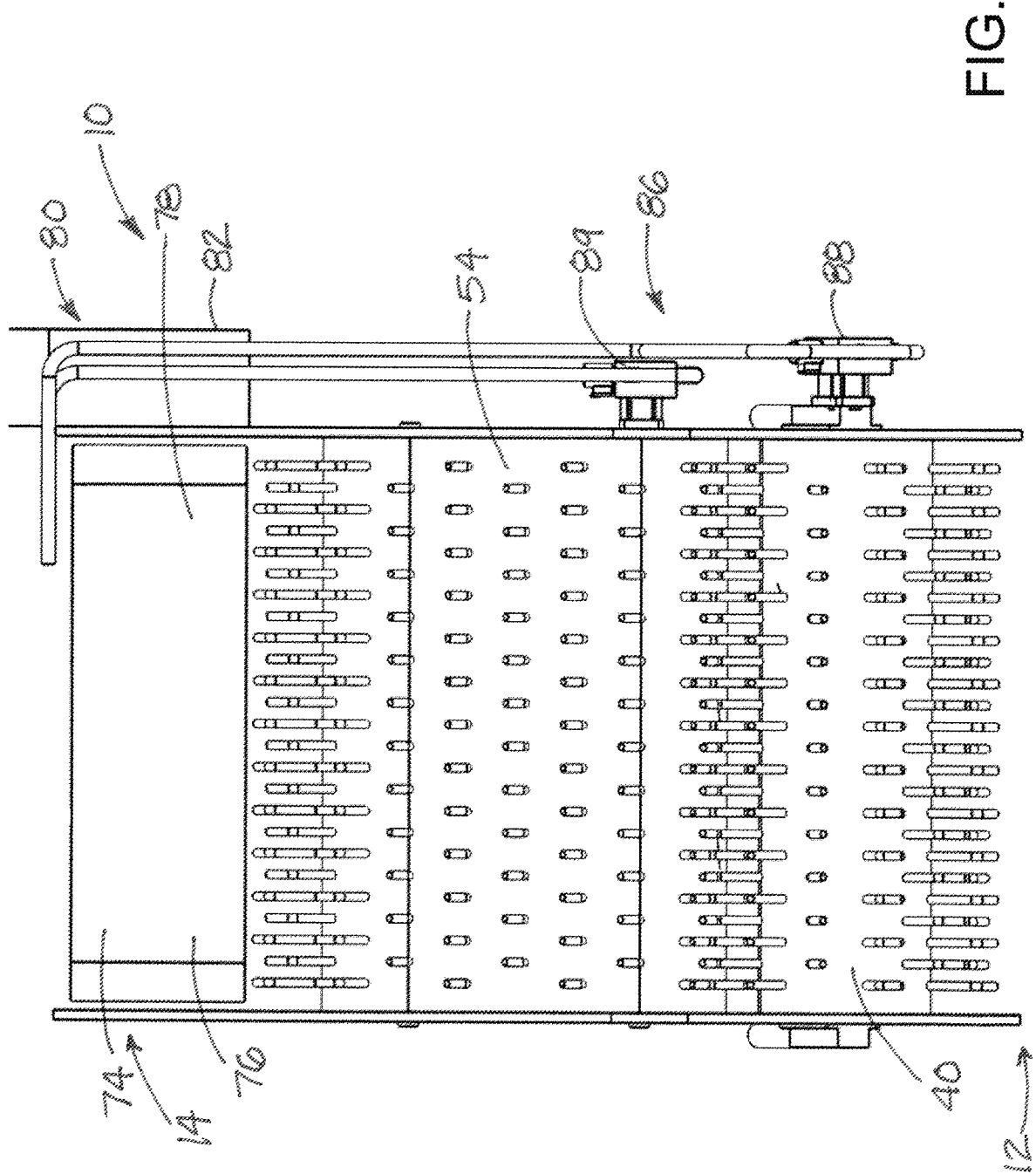
FIG. 7 is a schematic top view of the embodiment of the harvester apparatus of FIG. 1 with portions removed to reveal detail of the apparatus, according to an illustrative embodiment.
Figure 8:
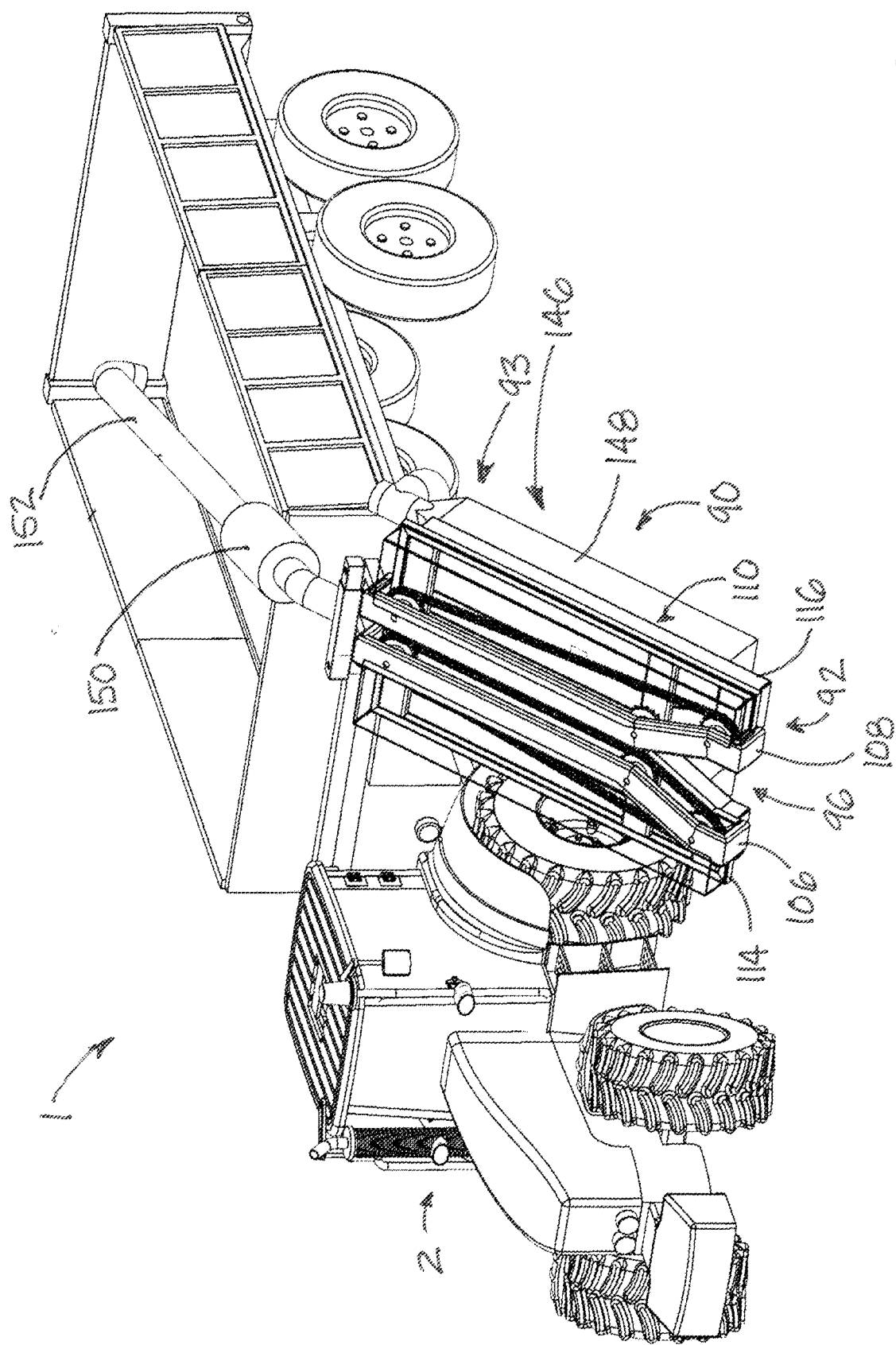
FIG. 8 is a schematic perspective view of a new crop harvesting system with yet another embodiment of a harvester apparatus, according to the present disclosure.
Figure 9:
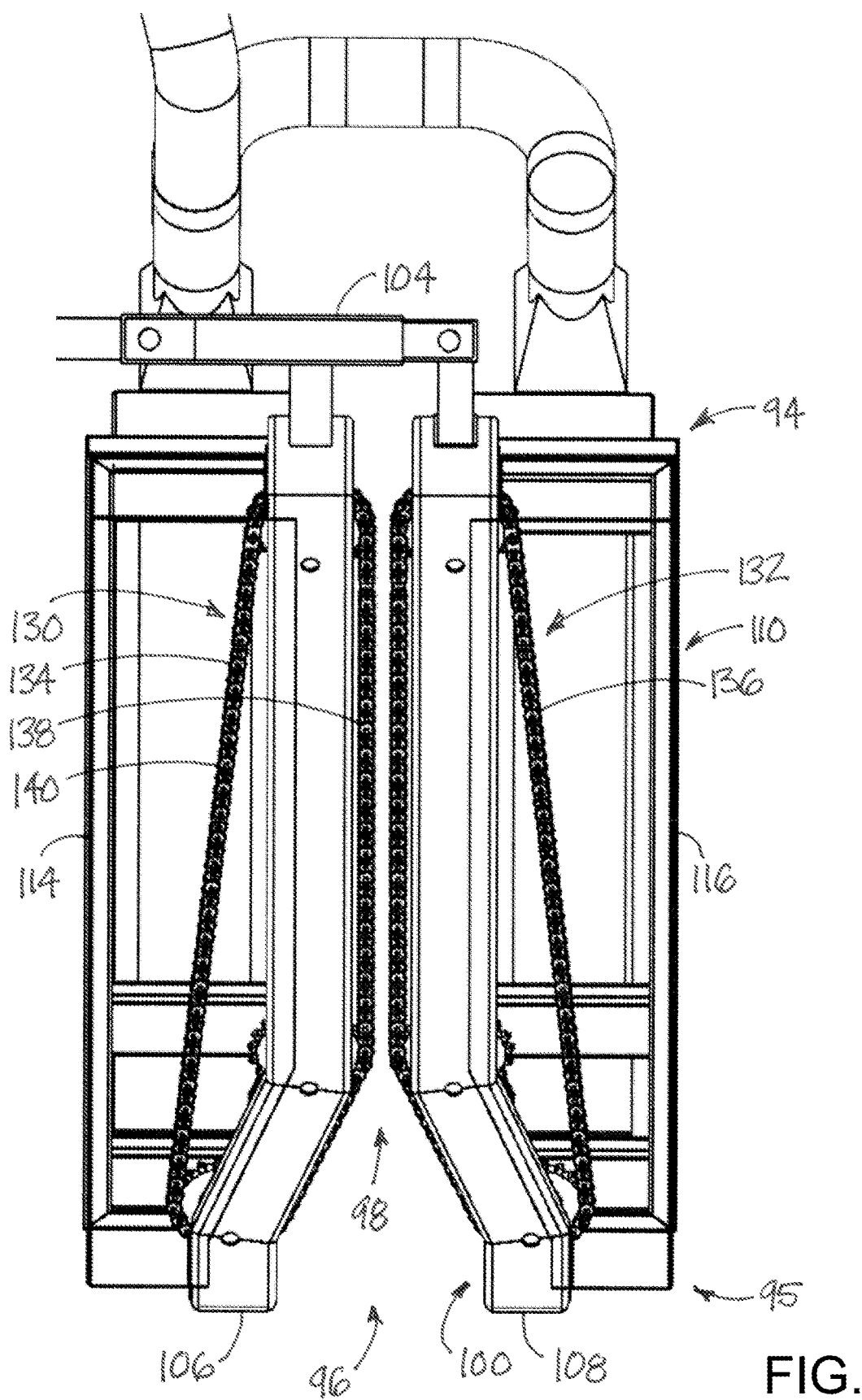
FIG. 9 is a schematic top view of the embodiment of the harvesting apparatus of FIG. 8, according to the present disclosure.
Figure 10:
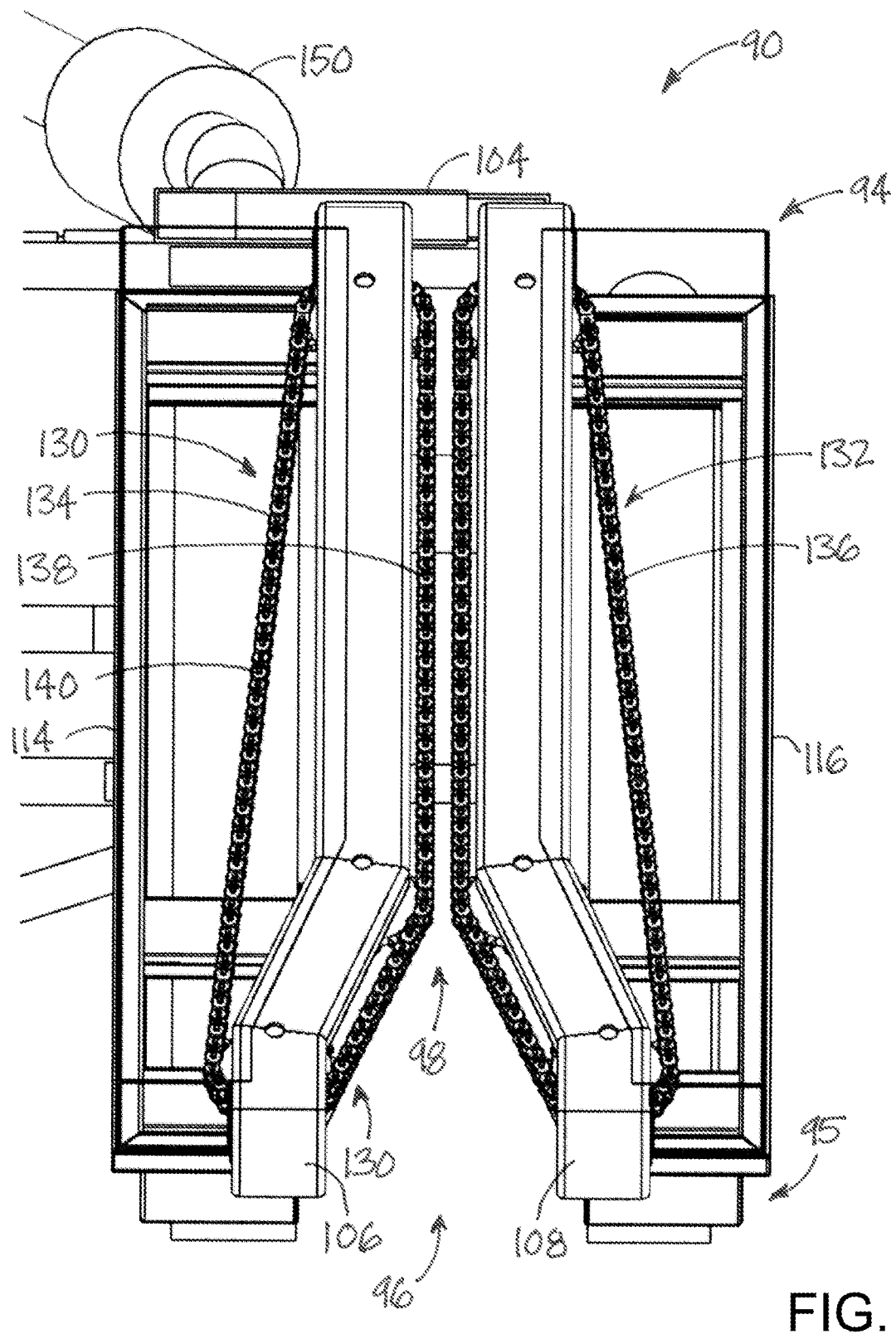
FIG. 10 is a schematic front view of the embodiment of the harvesting apparatus of FIG. 8, according to the present disclosure.
Figure 11:
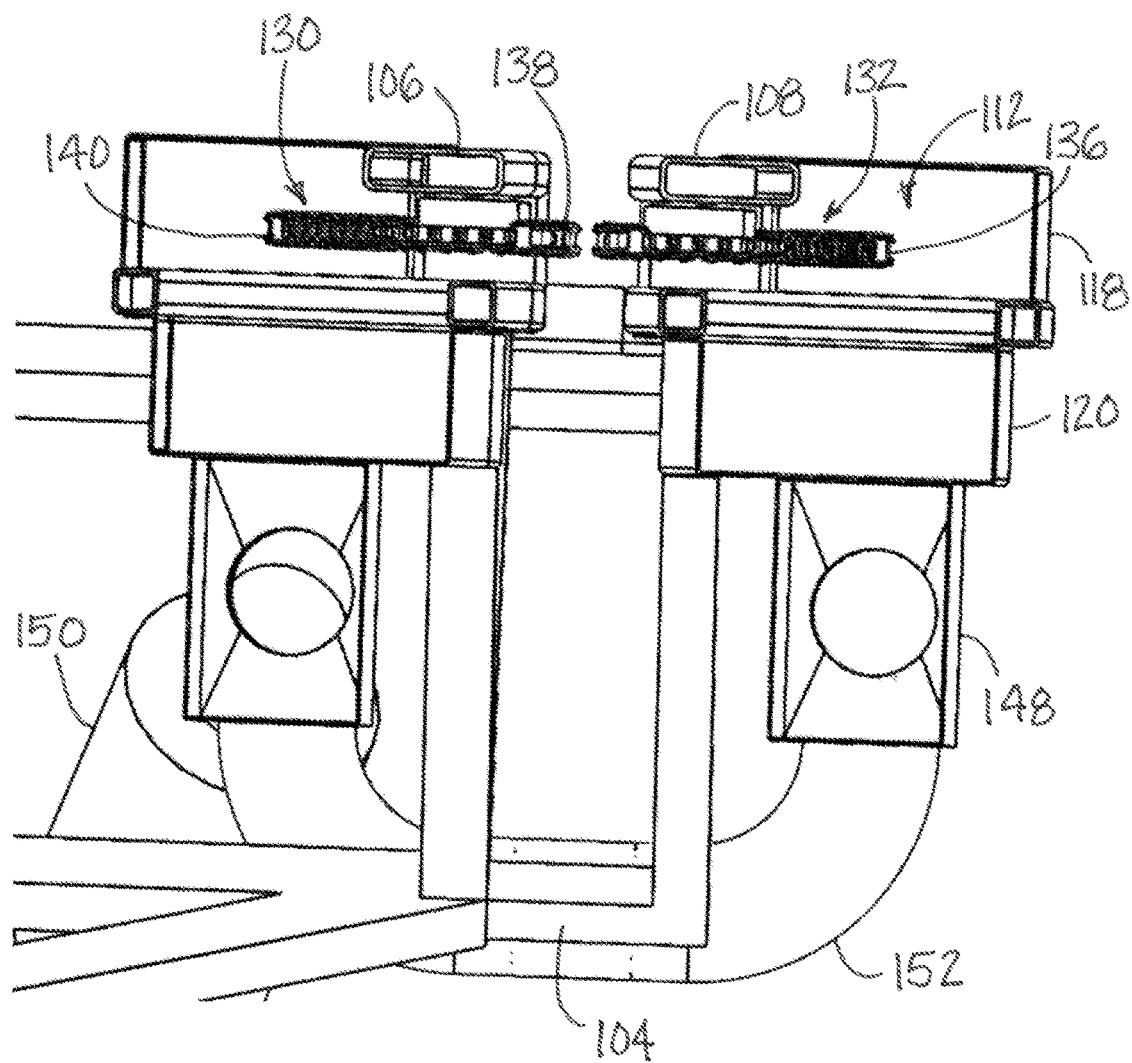
FIG. 11 is a schematic transverse sectional view of the embodiment of the harvester apparatus of FIG. 8, according to the present disclosure.
Figure 12:
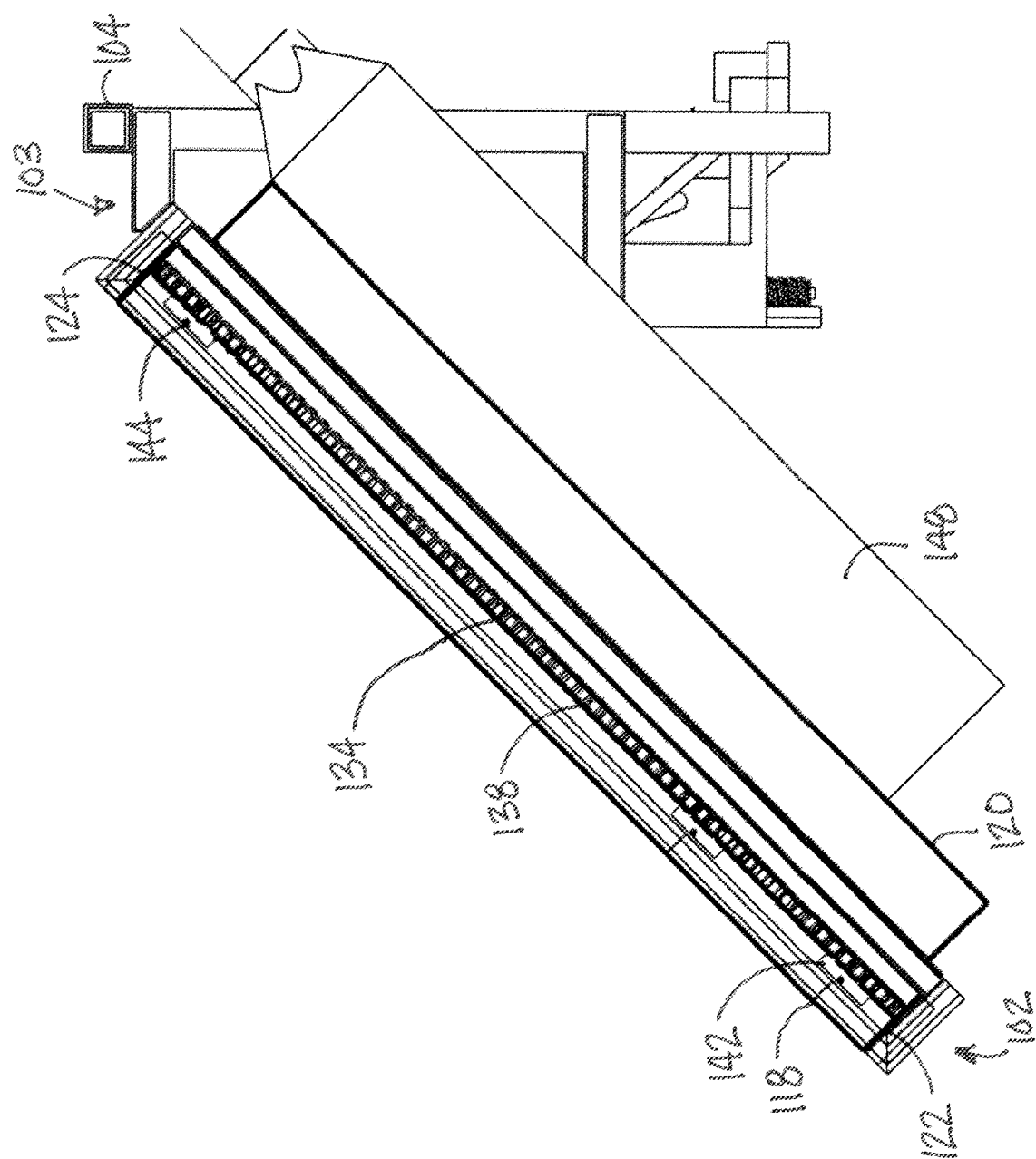
FIG. 12 is a schematic longitudinal sectional view of the embodiment of the harvester apparatus of FIG. 8, according to the present disclosure.
Figure 13:
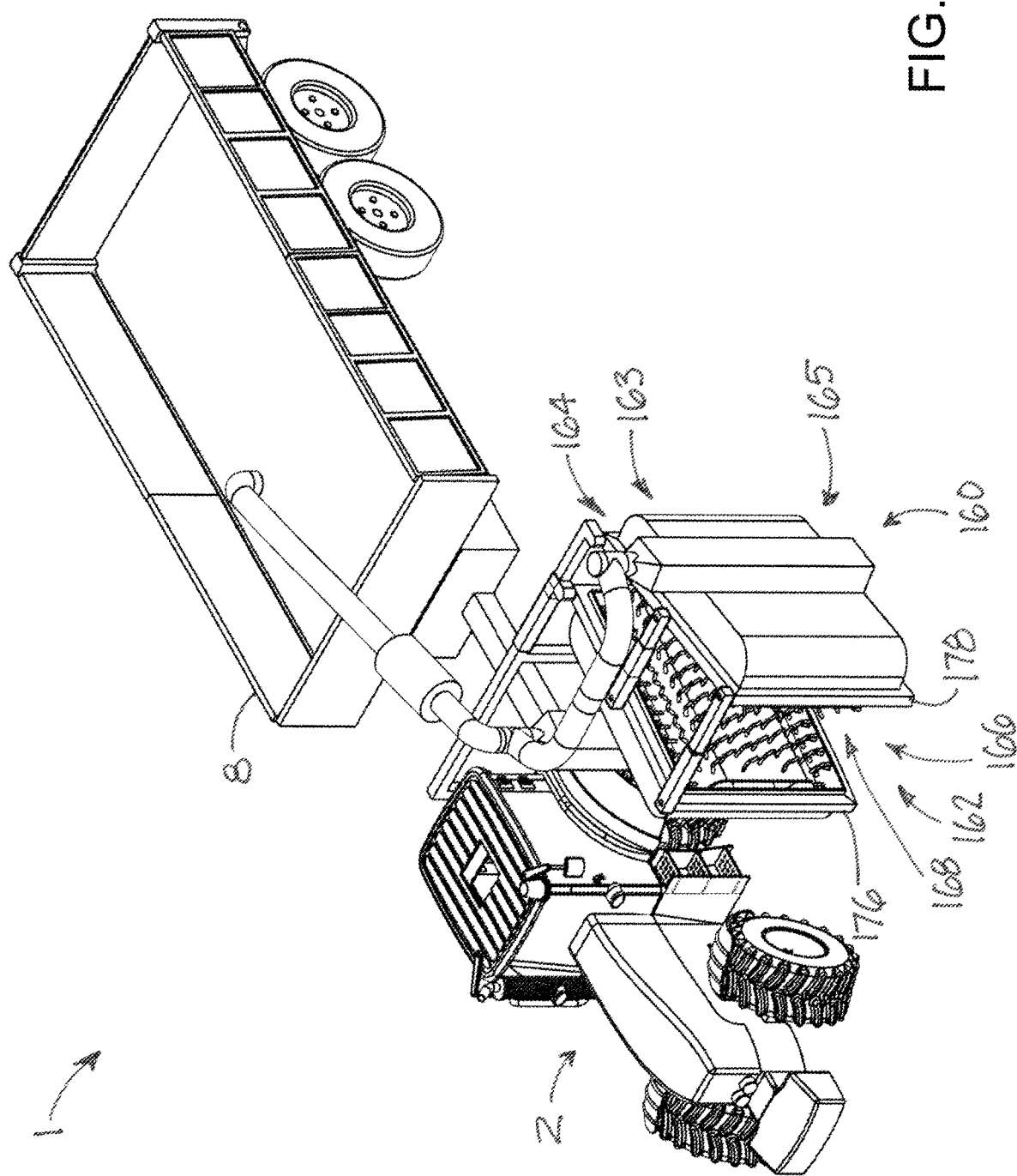
FIG. 13 is a schematic perspective view of a new crop harvesting system with another embodiment of a harvester apparatus, according to the present disclosure.
Figure 14:
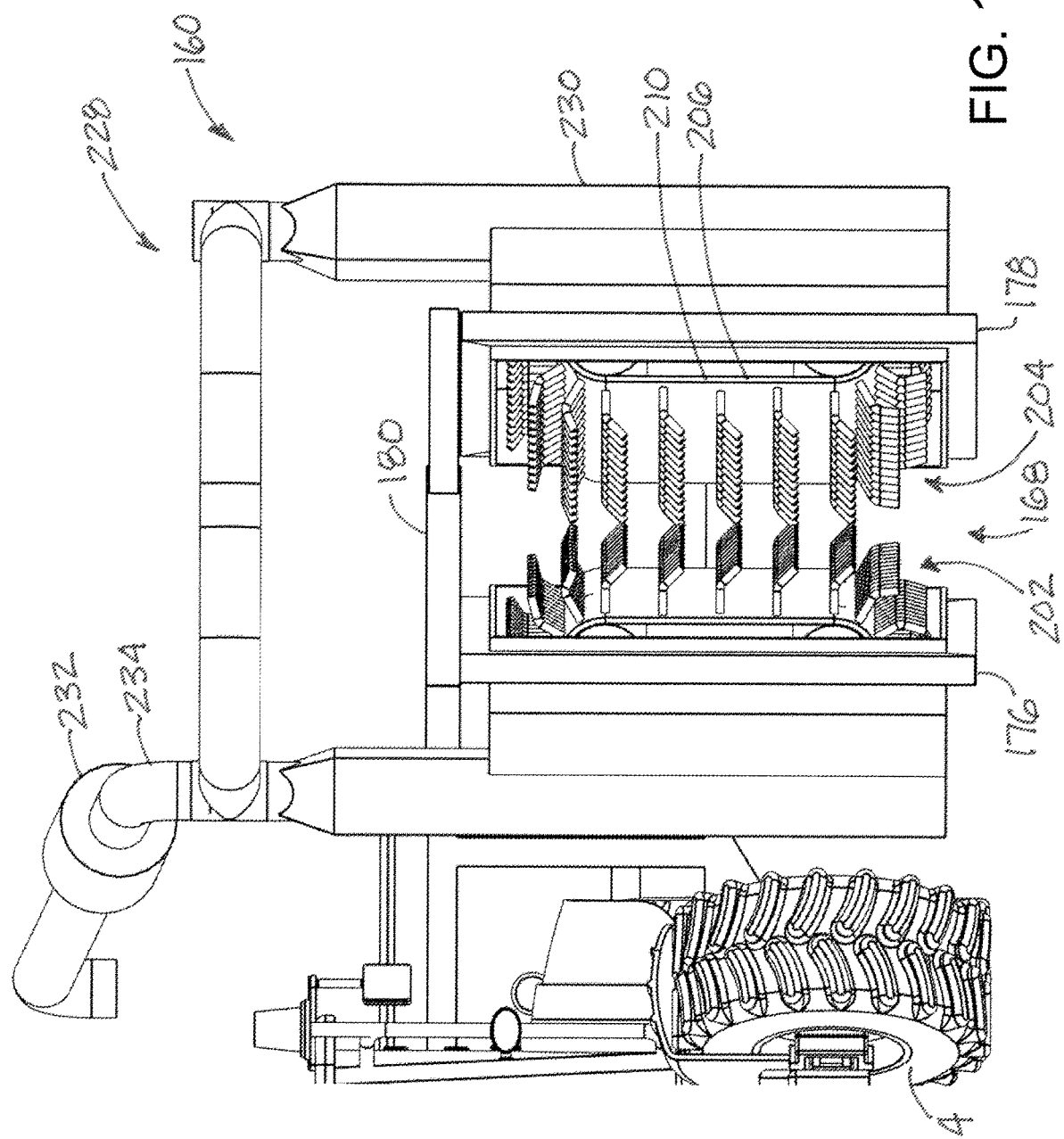
FIG. 14 is a schematic front view of the harvester apparatus of the crop harvesting system of FIG. 13, according to the present disclosure.
Figure 15:
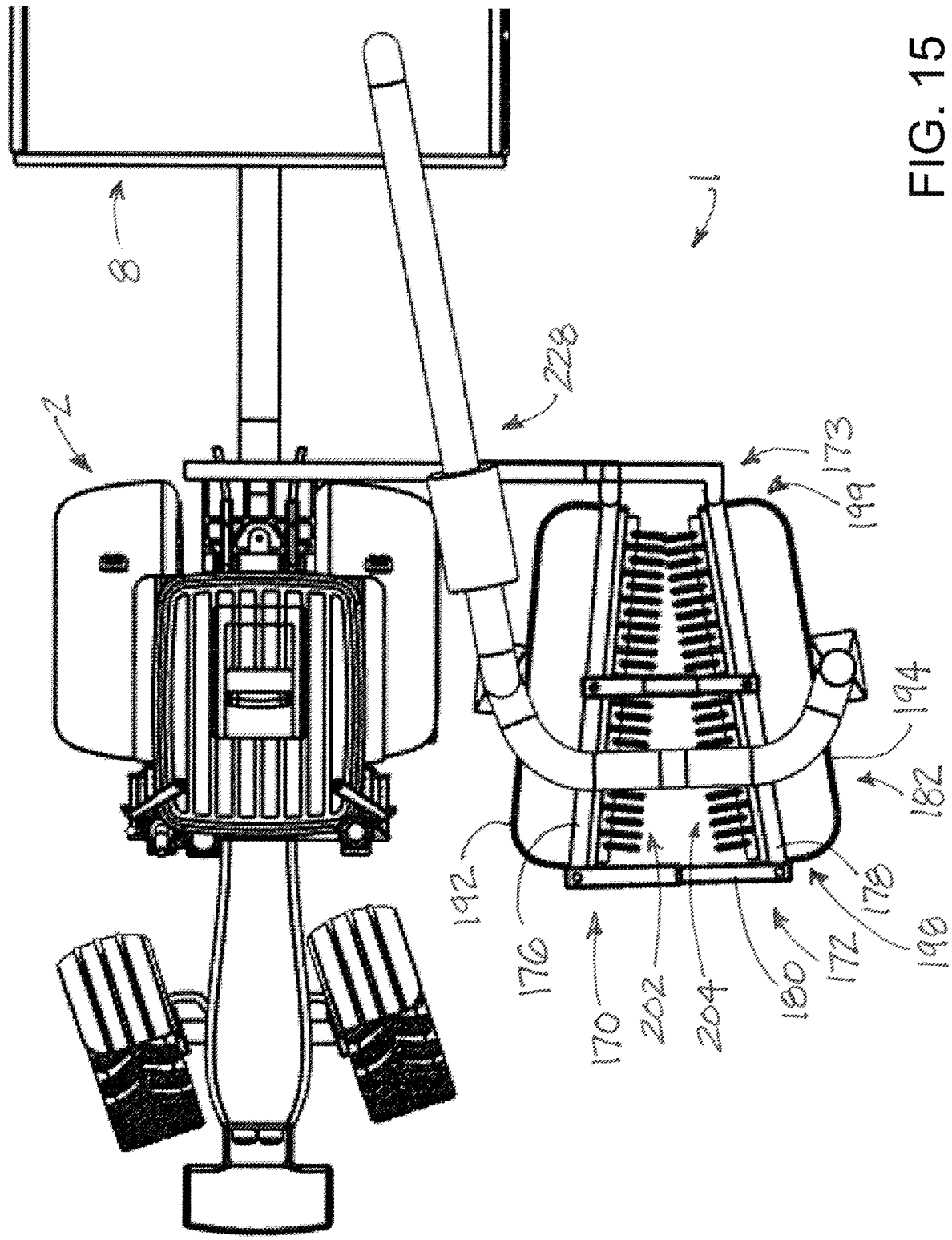
FIG. 15 is a schematic top view of the embodiment of the crop harvesting system of FIG. 13, according to the present disclosure.
Figure 16:
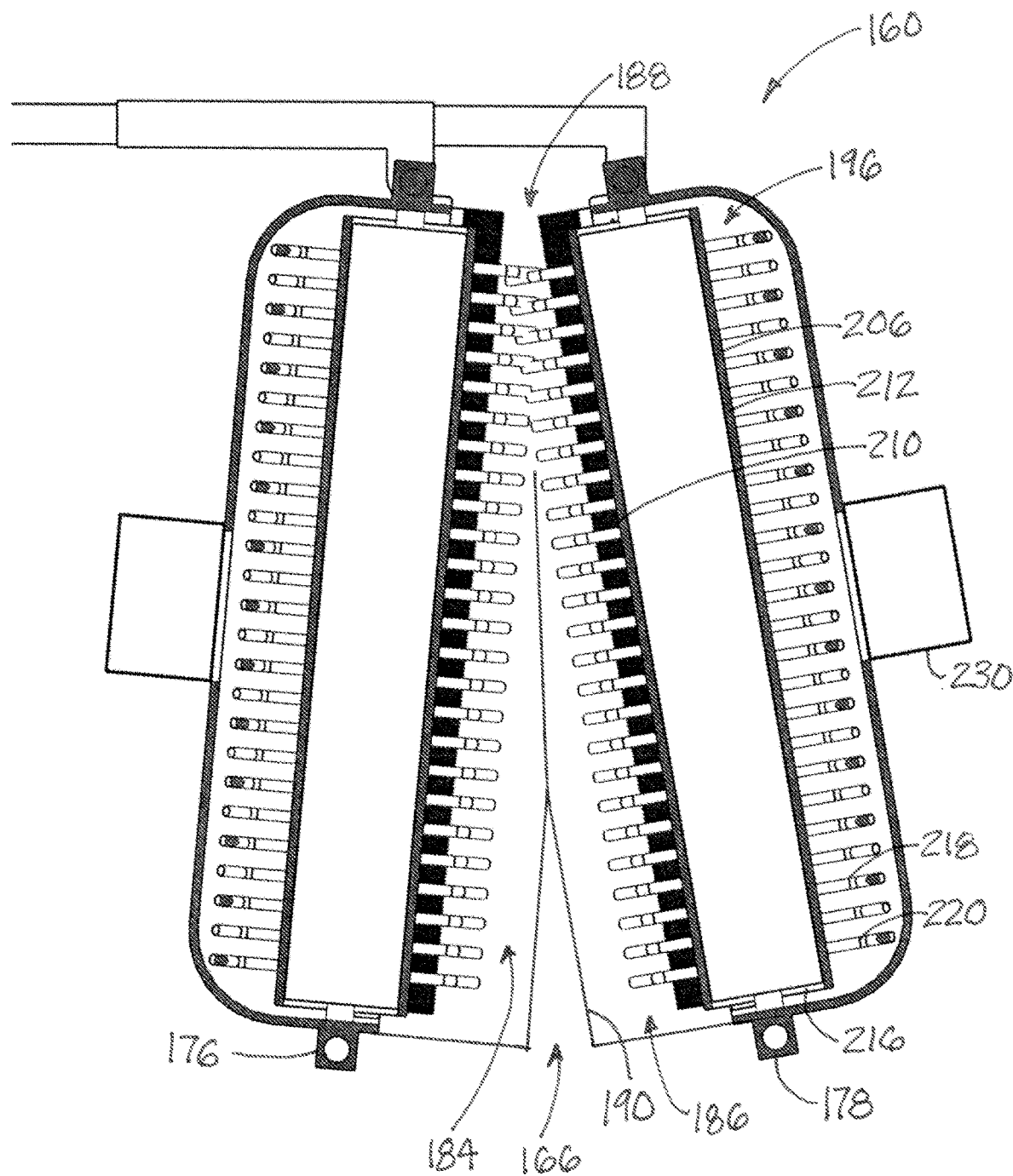
FIG. 16 is a schematic top view of the embodiment of the harvester apparatus of FIG. 13, according to an illustrative embodiment.
Figure 17:
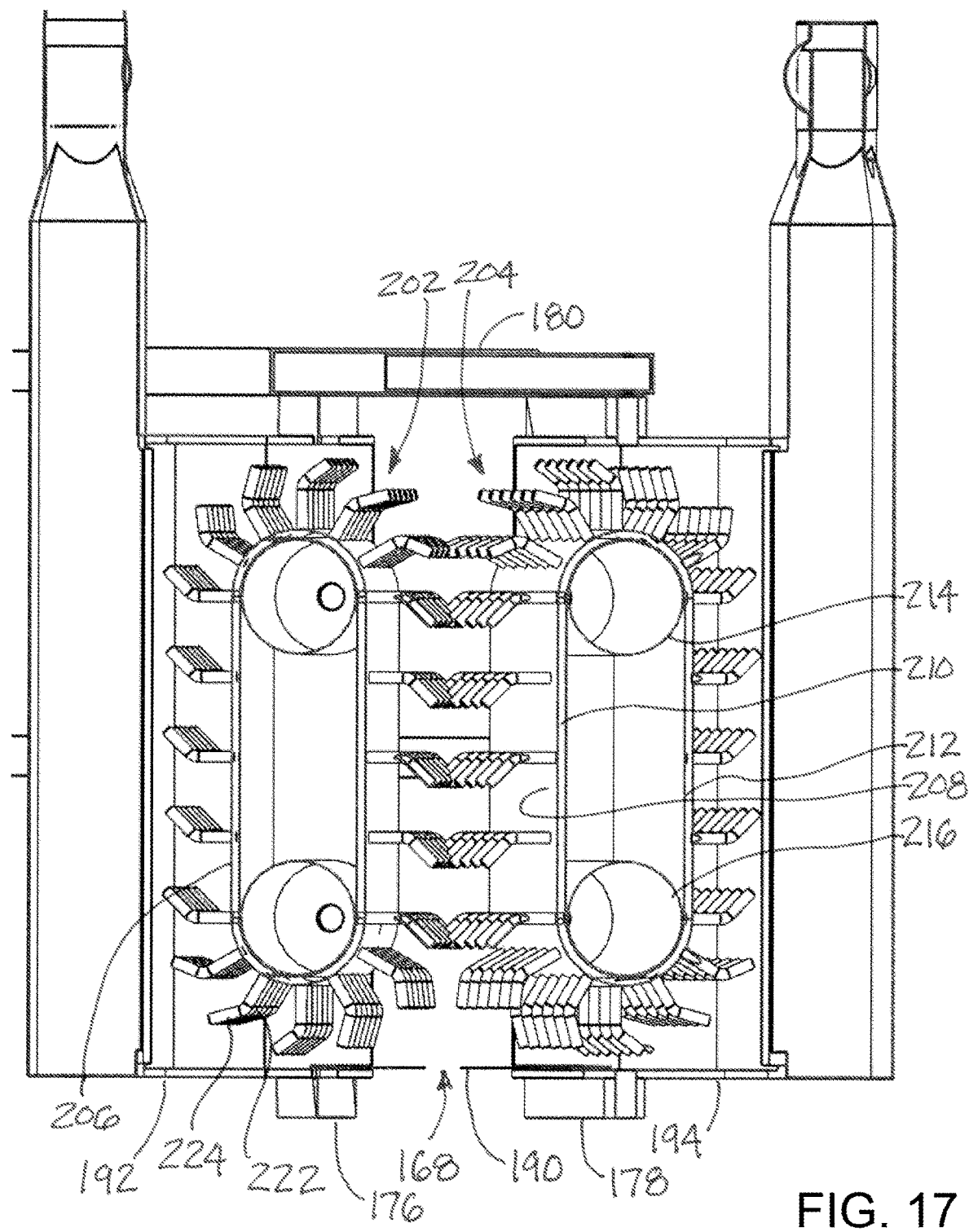
FIG. 17 is a schematic sectional view of the embodiment of the harvester apparatus of FIG. 13, according to an illustrative embodiment.

With reference now to the drawings, and in particular to FIGS. 1 through 17 thereof, a new crop harvesting system embodying the principles and concepts of the disclosed subject matter will be described.

In one aspect, the disclosure relates to a crop harvesting system 1 which may include a tractor 2 which is generally movable in a forward direction across the ground surface of, for example, an agricultural field for the purpose of harvesting a crop of plants growing in the field. Illustratively, the tractor 2 may have a tractor frame 3 on which a plurality of wheels 4 are mounted. The tractor 2 may also include at least one lift arm 5 which is mounted on the frame 3, and may be movable with respect to the frame 3 such as in a pivotal manner. The lift arm 5 may have a proximal end which is pivotally mounted on the tractor frame 3, and the lift arm 5 may have a distal end 6 and a mount 7. Typically, although not necessarily, the tractor 2 may have a pair of lift arms 5 both having a substantially identical configuration.

The system 1 may also include a collector wagon 8 for collecting or receiving the harvested plant parts of the crop and which is towable by the tractor, typically by removable attachment to the tractor via a tongue. It will be recognized that other means for collecting the plant parts may also be utilized.

A significant aspect of the system 1 is a harvester apparatus which may be utilized in combination with the tractor 2. The harvester apparatus may be operable to remove at least some parts of the plants of the crop as those plants are rooted in the ground of the agricultural field, and in some implementations of the harvester apparatus, parts of the plants may remain rooted in the ground after being engaged by the apparatus. For example, in the illustrative case of *cannabis* plant harvesting, the harvester apparatus may remove parts of the rooted plant, such as the buds, from other parts of the plant, such as the stalks, and leave those parts of the plant rooted in the ground in the field after the harvester apparatus has passed over the plant.

One illustrative embodiment, shown in FIGS. 1 through 7, has a harvester apparatus 10 with a front 12 generally oriented in the direction of movement of the apparatus 10 during operation of the apparatus, when the apparatus 10 is mounted on the tractor for use, and a rear 14 generally oriented opposite of the direction of movement. References to front, forward, rear, and rearward generally refer to the orientation of the apparatus 10 when it is being moved across an agricultural field and operated to harvest the plants of a crop. The harvester apparatus 10 may have an intake throat 16 for intaking at least a portion of a plant growing in the agricultural field for the purpose of removing at least some parts of the plants from other parts of the plants, while not necessarily removing substantially the entire plant from being rooted in the field.

The harvester apparatus 10 may also include a harvester frame 20 which may be mounted on the at least one lift arm 5 when the apparatus 10 is mounted on the tractor 2 for use. The harvester frame 20 may has a forward end 22 located toward the front 12 of the harvester apparatus and a rearward end 23 located toward the rear 14 of the apparatus 10. The harvester frame 20 may include a mounting structure 24 which is configured to mount on the lift arm or arms 5 of the tractor, and may be located toward the rearward end 23 of the frame 20 such that the apparatus 10 is generally positioned forward of the tractor 2 during movement and operation. The harvester frame 20 may be movably mounted on the lift arm to permit optimal positioning of the apparatus 10 with respect to the ground surface of the agricultural field, and may include additional mechanism for pitching the harvester frame laterally to the right or to the left to accommodate sloped or uneven field surfaces. The harvester frame 20 may also be removably mounted on the lift arm to permit removal of the apparatus 10 from the tractor during periods of nonuse of the apparatus.

A harvester housing 30 may be mounted on the harvester frame 20 of the harvester apparatus and may define an interior 32 of the apparatus 10. The harvester housing 30 may have a lower opening 34 and a forward opening 36, and these openings may converge to produce a larger opening. The harvester housing 30 may also include a pair of lateral side walls 37, 38 and an upper wall 39, as well as a rear wall to at least partially define the interior 32.

The harvester apparatus 10 may also include elements to cause and facilitate the separation of some parts of the plants from other parts of the plants. In the illustrative embodiment, the apparatus 10 includes an infeed head 40 which is configured to engage, and may at least partially pull into the interior 32, plants which are rooted in the agricultural field, and facilitate the stripping of plant parts from other parts of the plants, typically as at least some of the plant parts remain rooted in the ground of the field. The infeed head 40 may be rotatably mounted on the harvester frame 20, and may be located toward the front 12 of the apparatus 10 as well as the forward end 22 of the frame 20. The infeed head 40 may be located generally above the intake throat 16, and may be located forwardly and upwardly from the throat, and may form a portion of the throat 16. In some embodiments, a portion of the infeed head 40 may extend out of the forward opening 36 of the harvester housing 30, placing a portion of the head 40 in the interior 32 and a portion outside of the interior. Optionally, mechanism may be provided to permit a degree of adjustment of the position of the head 40 on the frame 22, for example, raise and lower the height of the head with respect to the ground surface to adjust to the height of the particular plants growing in the field being harvested.

In greater detail, the infeed head 40 may have an infeed head surface 42 which in the illustrative embodiment is substantially cylindrical in shape. The infeed head 40 may include a drum 44 on which the infeed head surface 42 is located. The head 40 may also have a plurality of fingers 46, 48 which extend outwardly from the infeed head surface.

The harvester apparatus 10 may further include an infeed conveyor 50 as an additional element to cause separation or stripping of some plant parts from other plant parts. The infeed head 40 and the infeed conveyor may operate cooperatively to produce the stripping function, and may be separated by a gap 52 which forms a portion of the intake throat 16. The infeed conveyor 50 may also be configured to convey plant parts that have been stripped away from the plant parts which may remain rooted in the ground of the agricultural field. A portion of the infeed conveyor 50 may be located in the interior 32 of the harvester housing, while a portion of the infeed conveyor may extend out of the lower opening 34 of the housing, generally at a location adjacent to the front 12 of apparatus 10.

In the illustrative embodiments, the infeed conveyor 50 may include an infeed belt 54 which may form an endless loop and has an outer surface 56. The infeed belt 54 may have an upper extent 58 and a lower extent 60, with these extents 58, 60 being generally substantially horizontally oriented. A plurality of fingers 62, 64 may extend outwardly from the infeed belt, and may extend outwardly from the outer surface 56.

The fingers 46, 48 of the infeed head 40 and the fingers 62, 64 of the infeed conveyor 50 may be similar in a number of characteristics. Each of the fingers may be oriented substantially perpendicular to the surface from which is extends, and the fingers of the head 40 and conveyor 50 may protrude similar distances from the respective surfaces. Each of the fingers may be formed of a substantially rigid material which exhibits limited flexibility with respect to the underlying surface to facilitate the stripping action of the fingers on the plant parts.

The fingers 46, 48 on the infeed head 40 tend to initially engage upstanding plants growing in the field and urge portions of the plants to move downwardly toward the intake throat 16 to be engaged by both the fingers of the infeed head and the fingers of the infeed belt at the gap 52. Rotation of the head 40 and the conveyor 50 may be designed such that movement of these elements causes the fingers to converge at the intake throat to draw portions of the plants into the intake throat. Illustratively, fingers on the head 40 may generally move downwardly and inwardly at the front 12 of the apparatus 10, and the fingers on the conveyor 50 may generally move upwardly and inwardly at the front 12.

A portion of the fingers on the infeed head and a portion of the fingers on the conveyor belt extend into the gap 52 forming the infeed throat 16, and plants which are initially engaged by the fingers on the infeed head are pulled downwardly toward the intake throat and subsequently engaged by fingers on the infeed conveyor such that fingers from opposite directions moving toward and into the throat engage the plant to strip plant parts from each other, such as detaching the buds of the *cannabis* plant from the stalks and stems of the *cannabis* plant.

In some embodiments, some or all of the fingers of the infeed head 40 and the infeed conveyor 50 have at least two sections 70, 72, with a first section 70 of the fingers may be oriented substantially perpendicular to the respective surface of the head 40 or conveyor 50. A second section 72 of the finger extending from the first section opposite of the respective surface may be oriented at an oblique angle with respect to the axis of the first section 70 to provide a degree of a hook shape to the finger. Illustratively, the measurement of the angle between the longitudinal axis of the first section 70 and the second section 72 of the fingers may be in the range of approximately 30 degrees to approximately 60 degrees, and in some embodiments may be approximately 45 degrees. The second section 72 of the finger may be oriented forwardly in the direction of movement of the finger in a leading arrangement to facilitate the engagement and pulling of the plants into the intake throat.

The fingers on the infeed head 40 may be arranged in circumferential rows and may be arranged on the infeed belt 54 in longitudinal rows oriented substantially parallel to the length of the belt. In some embodiments, the circumferential rows of the fingers on the infeed head and the longitudinal rows of the fingers on the infeed belt may be laterally offset from each other such that the fingers on the head and the fingers on the belt do not normally come into contact with each other.

The harvester apparatus 10 may also include an outfeed conveyor 74 which is positioned rearwardly of the infeed belt 54 to receive plant materials of the crop from the infeed conveyor. The outfeed conveyor 74 may be oriented to move the plant materials laterally with respect to the harvester frame 20, such as from a first lateral end 76 of the conveyor to a second lateral end 78 of the conveyor.

The harvester apparatus 10 may also include an outfeed auger 80 which is configured to collect the plant materials of the crop from the outfeed conveyor 74 and deliver the plant materials to a collection point, such as the collector wagon 8. The outfeed auger 80 may have an input 82 which is located proximate to the second lateral end 78 of the outfeed conveyor 74, and may have an output 84 which is located in an elevated position above the collector wagon 8. Illustratively, the outfeed auger 80 may extend alongside the tractor 2.

The harvester apparatus 10 may also include a rotation mechanism 86 suitable to rotate the infeed head 40 and at least one of the spaced pulleys 66, 68 of the infeed conveyor 50. In some embodiments, the rotation mechanism 86 may include at least one motor 88 which is operatively connected to the infeed head and at least one of the spaced pulleys, and in some preferred embodiments includes a pair of motors 88, 89 with one motor 88 being associated with the infeed head 40 and one motor 89 being associated with one of the pulleys of the infeed conveyor. The rotation mechanism may be adjustable to adjust a speed of rotation of the infeed head and the infeed conveyor to adjust to differing conditions, including the speed of the movement of the harvester apparatus with respect to the ground surface, type of crop, etc. The speed of rotation of the infeed head and in feed conveyor may also be individually adjusted such that different rotation speeds between these elements may be achieved.

In other embodiments, such as shown in FIGS. 8 through 12, a harvester apparatus 90 may include elements that effectively straddle the plant and strip parts away from the plant as it is rooted in the field without necessarily bending the stalk of the plant. The harvester apparatus 90 has a front 92 for orienting in the general direction of movement of the apparatus during operation, a rear 93 for orienting away from the general movement direction, a top 94, and a bottom 95 for orienting toward the ground surface over which the apparatus 90 is being moved during operation. Movement of the plant through the apparatus 90 is generally accomplished by movement of the apparatus with respect to the ground surface in which the plant is rooted although elements of the apparatus may assist in the movement.

The harvester apparatus 90 may intake plants portions of the plants growing upwardly from the ground surface through an intake throat 96 located toward the front 92 as the apparatus 90 is moved in a generally forward direction, such as by the tractor 2. The harvester apparatus 90 may define a plant path 98 through the harvester apparatus which extends from the front 92 to the rear 93, and generally extends rearwardly and upwardly from the intake throat 96. The plant path 98 may thus generally ascend or extend upwardly from the ground surface as the plant moves from the intake throat along the path toward the rear 93 of the apparatus.

The harvester apparatus 90 may include a harvester frame 100 which is mountable on the tractor 2, and may be removable from the tractor frame during times of nonuse and storage. The harvester frame 100 may have a forward end 102 located toward the front 92 of the apparatus 90, and a rearward end 103 located toward the rear 93 of the harvester apparatus. In some greater detail, the harvester frame 100 may include a mounting structure 104 which is mounted on the tractor 2 and may extend laterally from the tractor frame to a position that is lateral to the tractor. The frame 100 may also include a pair of support structures 106, 108 which are mounted on the mounting structure 104 and may include a first support structure 106 and a second support structure 108. Each of the support structures may extend forwardly from the mounting structure to the forward end 102 of the frame 100. At least one of the support structures 106, 108 may be movably mounted on the mounting structure to permit movement of the structures laterally with respect to each other and adjust the width of the plant path 98 between the structures. Illustratively, the second support structure 108 may be laterally movable with respect to the first support structure 106.

A harvester housing 110 of the harvester apparatus 90 may be mounted on the harvester frame 100 and may define an interior 112 of the harvester apparatus. The harvester housing may be divided into two sections located on opposite sides of the intake throat 96 and the plant path 98. The harvester housing may comprise a pair of housing sections 114, 116 which are positioned on the opposite sides of the intake throat and plant path and each of the housing sections may define a portion of the housing interior 112. Each of the housing sections may include an upper cover 118 and a lower tray 120. The upper cover 118 may be formed of any suitable material, and in some optional implementations may be formed of a transparent material. Each of the housing sections 114, 116 may have a leading end 122 which is oriented toward the front 92 of the harvester apparatus and a trailing end 124 which is oriented toward the rear 93 of the harvester apparatus. Each of the housing sections 114, 116 may be open toward the plant path 98 such that plant parts removed from the plants may be received into the portions of the interior 112 defined by each of the sections.

The harvester apparatus 90 may also include a pair of stripping assemblies 130, 132 which are mounted on the harvester frame 100 and may be at least partially positioned in the interior 112 of the harvester housing 110. Each of the stripping assemblies may be associated with one of the housing sections 114, 116 of the housing, and may be mounted on one of the support structures 106, 108. The stripping assemblies 130, 132 may tend to converge toward the rear 93 of the harvester apparatus to narrow the plant path 98 defined between the stripping assemblies. Illustratively, the area of convergence of the stripping assemblies may be located relatively close to the front 92 of the apparatus such that the plant path 98 narrows at the throat 96 and may be relatively uniform for a large portion of the plant path from the throat to the rearward end 103 of the frame.

In greater detail, each of the stripping assemblies 130, 132 may include a flexible stripping member 134, 136 which is positioned on a side of the plant path 98 such that the stripping members of the stripping assemblies are oriented in an opposing relationship to contact plants moving along the plant path and remove plant parts from the plants. The stripping member may be an endless loop, and illustratively may be formed of a stripping chain or a stripping cable or other suitable elongate endless loop member. Each stripping member may have an active extent 138 which may be positioned in opposition to the active extent of the stripping member of the other stripping assembly. The active extent 138 of each stripping member may be oriented at an incline to the horizontal, and the incline of the active extent may have an angle measuring approximately 30 degrees to approximately 60 degrees with respect to the horizontal plane. Illustratively, the angle of incline of the stripping member may be approximately 45 degrees with respect to the horizontal plane. The active extents may extend generally rearwardly and upwardly from the intake throat.

Movement of the active extents of the stripping members alongside of the plant path tends to engage portions of the plant which extend generally horizontally outward from the main stalk of the plant, such as the stems radiating outwardly from the stalk and the buds on the stems. The engagement and movement of the active extents on substantially opposite sides of the stalk of the plant tends to detach the buds from the stems and the stalk such that the buds are available to be conveyed and collected, while the stalk as well as many of the stems remain with the portion of the plant rooted in the ground.

The stripping member may also have an inactive extent 140 representing a portion of the endless loop which is not located along or adjacent to the plant path. The stripping member may be associated with one of the housing sections 114, 116 of the harvester housing, and at least a portion of the active extent 138 of the stripping member may extend out of the housing section 2 define the plant path and a portion of the inactive extent 140, may be positioned in the interior of the housing defined by the respective housing section.

Each stripping assembly may also include a pair of spaced sprockets 142, 144 on which each stripping member is entrained. A forward sprocket 142 may be located relatively closer to the bottom 95 of the apparatus, while a rearward sprocket 144 may be located relatively closer to the top 94 of the apparatus. Each of the sprockets 142, 144 may be rotatable about an inclined axis oriented generally perpendicular to the path of the active extent 138 of the stripping member.

The harvester apparatus 90 may further include a collection assembly 146 which is configured to collect plant parts stripped by the harvester apparatus from the plants of the crop. The collection assembly 146 may comprise a pneumatic collection assembly and may produce a negative pressure suction condition in the portions of the interior defined by the sections of the harvester housing to thereby cause plant parts stripped from the plants to enter the sections of the harvester housing after being stripped from the plant stock. The collection assembly 146 may comprise a collection box 148 which is in fluid communication with the interior of the harvester housing. One of the collection boxes 148 may be mounted on and may be in communication with each of the housing sections 114, 116 of the apparatus. A collection fan 150 may be in fluid communication with the collection box or boxes to draw air and plant parts out of the collection boxes and to the fan. A collection conduit 152 may connect the collection fan to the collection box or boxes.

In yet other embodiments, such as shown in FIGS. 13 through 17, a harvester apparatus 160 may also include elements which are positionable on opposite sides of a plant, or a row of plants, rooted in the ground surface of an agricultural field to engage the plants and detach parts of the plants from other plant parts. In greater detail, the harvester apparatus 160 has a front 162 and a rear 163 as well as a top 164 and a bottom 165. The apparatus 160 may be generally configured to intake plants of a crop at a location toward the front 162 of the apparatus, and may have an intake throat 166 located toward the front for intaking portions of the plants growing upwardly from the ground surface as the apparatus is moved in a generally forward direction, such as by tractor 2. The harvester apparatus 160 may define a plant path 168 which extends rearwardly from the intake throat 166 through the apparatus 160 to the rear 163.

The harvester apparatus 160 may include a harvester frame 170 which may be mountable on the tractor 2, and typically is removably mounted on the tractor. The harvester frame 170 has a forward end 172 located toward the front 162 of the harvester apparatus and a rearward end 173 located toward the rear 163 of the harvester apparatus. The harvester frame 170 may include a mounting structure 174 which is mounted on the tractor and may extend laterally from the tractor frame 3 to a position lateral to the tractor to support the apparatus 160. The harvester frame 170 may also include a pair of support structures 176, 178 which are mounted on the mounting structure 174 to be supported thereon. Each of the support structures 176, 178 may be movable with respect to each other, and may be pivotally movable with respect to the mounting structure. Illustratively, each of the support structures 176, 178 may form a perimeter frame which may be substantially continuous.

The harvester frame 170 may also include at least one spreader element 180 which extends between and is mounted on the support structures 176, 178. The spreader element 180 may be extendable to move portions of the support structures away from each other, which may be a configuration suitable for operation and usage of the harvester apparatus 160, and the spreader element may be retractable to move the portions of the support structures toward each other, which may be a configuration suitable for transport or storage of the apparatus 160. In some embodiments, more than one spreader element 180 may be employed. Illustratively, the spreader element or elements may comprise a plurality of tubular segments that are telescopically coupled together to permit extension and retraction thereof.

The harvester apparatus 160 may also include a harvester housing 182 which is mounted on the harvester frame 170 and may define an interior 184 of the harvester apparatus 160. The housing may define a forward opening 186 which generally corresponds to the intake throat 166 through which a growing plant passes into the interior 184 of the housing, generally due to the forward movement of the apparatus 160 by the tractor 2. The housing what 82 may also have a rearward opening 188 through which the growing plant passes out of the interior 184 due to the movement of the apparatus. The harvester housing may have a lower slot 190 through which a stalk of the growing plant passes as the plant moves into the interior 184 through the forward opening 186 and out of the interior through the rearward opening 188. The lower slot 190 may be at least partially formed by a flexible material configured to conform about the stalks of the plants moving into and out of the interior of the harvester housing.

The harvester housing 182 may include a pair of housing shells 192, 194 which are generally oriented in an opposing relationship about a vertical plane to define a plant path therebetween. Each of the housing shells 192, 194 may define a subchamber 196 of the interior of the harvester housing with a portion of the interior 184. Each of the housing shells may have a leading end 198 which is oriented toward the front 162 of the apparatus 160, and a trailing end 199 which is oriented toward the rear 163 of the apparatus. Each of the housing shells may have an inward opening 200 such that the inward openings of the shells 192, 194 are positioned in opposition to each other, but may generally be spaced from each other on either side of the plant path at least when the harvester frame is in an operational configuration. The inward opening 200 of each of the shells may generally correspond to the perimeter of a respective support structure 176, 178.

In some embodiments, the housing shells 192, 184 may have an operational configuration which may be utilized when the harvester apparatus is being operated to harvest parts of the plants. The operational configuration may be characterized by the leading ends 198 of the housing shells being spaced from each other at a first distance and the trailing ends 199 of the shells being spaced from each other at a second distance, with the first distance being greater than the second distance such that the housing shells diverge from each other toward the front 162 of the apparatus and virtually converge toward the rear 163 of the apparatus. As a result, the plant path 168 may be relatively wider towards the front 162 and may be relatively narrower towards the rear 163. The housing shells 192, 194 may also have a nonoperational configuration for transport and storage of the apparatus, and may be characterized by the leading ends 198 and the trailing ends 199 being generally uniformly spaced from each other to provide a more compact configuration of the harvester apparatus.

The harvester apparatus may also include a pair of stripping assemblies 202, 204 which are mounted on the harvester frame and may be at least partially positioned in the interior 184 of the housing. Each of the stripping assemblies 202, 204 may be associated with one of the housing shells 192, 194, and each stripping assembly may be mounted on one of the support structures 176, 178 of the harvester frame.

In greater detail, each stripping assembly may include a stripping belt 206 which is positioned on a side of the plant path 168, and each has an outer surface 208 facing outward from the endless loop of the belt such that the surfaces 208 of the belts are oriented in an opposing relationship to each other. The stripping belt may have an active extent 210 representing a portion of the belt rotated toward the plant path and positioned in opposition to the active extent of the stripping belt of the other stripping assembly. The stripping belt may also have an inactive extent 212 representing a portion of the belt rotated away from the plant path and typically being positioned in the subchamber 196 of the shell. In the operational configuration of the harvester housing 182, the outer surfaces 208 of the active extents of the stripping belts of the stripping assemblies may be oriented to converge toward the rearward opening 188 of the housing and diverge away from each other toward the forward opening 186 of the housing 182.

Each of the stripping assemblies may also include a pair of spaced pulleys 214, 216 on which the stripping belt 206 is entrained, with an upper pulley 214 being located relatively closer to the top 164 of the harvester apparatus and a lower pulley 216 being located relatively closer to the bottom 165 of the harvester apparatus. The pulleys 214, 216 may be spaced in a substantially vertical plane with each of the pulleys being rotatable about a substantially horizontal axis such that the outer surface of the extents 208, 210 are substantially vertically oriented and, for example, the active extent may move in a downward direction and the inactive extent may move in an upward direction.

The stripping assemblies meet each also include a plurality of fingers 218, 220 which extend outwardly from the stripping belt 206, and the fingers may extend substantially perpendicular to the outer surface 208 of the respective belt. In some embodiments, the portion of the fingers located on the current active extent of the belt may extend into the plant path 168 of the apparatus. Typically, the stripping belts are rotated such that the fingers on the stripping belts move in a downward direction on opposite sides of the plant path 168. In some embodiments, the positioning of the fingers on one of the stripping belts may be offset from the positioning of the fingers on the other stripping belts to minimize the opportunity for direct contact between the fingers on one belt with the fingers on the other belt.

In some embodiments, each of the fingers may have at least two sections 222, 224, with the first section 222 being oriented substantially perpendicular to the outer surface 208 of the belt and a second section 224 of the finger extending from the first section and being oriented at an oblique angle with respect to the orientation of the first section. Further information on the relationship between the first and second sections of the fingers are described elsewhere in this disclosure.

The harvester apparatus may also include a collection assembly 228 which is configured to collect plant parts stripped by the harvester apparatus from the plants in a collection location, such is in a collector wagon 8. Illustratively, the collection assembly 228 may comprise a pneumatic collection assembly which may apply a relatively negative pressure suction condition in the subchamber 196 of each of the housing shells of the harvester housing 182 to cause the plant parts stripped from the plants to enter the subchamber and then be moved to a suitable location for transport of the plant parts. The collection assembly 228 may include a collection box 230 which is in fluid communication with the interior 184 of the harvester housing, and more specifically with the subchamber 196 of each of the housing shells 192, 194 such that the application of the negative pressure condition to the interior of the collection box results in a negative pressure condition in the subchamber, and causes the harvested plant parts to move from the subchamber 196 into the collection box. A collection fan 232 of the collection assembly 228 may be in fluid communication with the collection box 230 to draw air and plant parts out of the collection box and through a collection conduit 234 which connects the collection fan to the collection box, as well as connecting the collection fan to the ultimate disposal location of the plant parts, such as the collector wagon 8.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for removing parts from plants rooted in an agricultural field while leaving other parts of the plants rooted in the agricultural field, the system comprising:
    a harvester apparatus having a front and a rear and a top and a bottom, the harvester being configured to receive a plant into an intake throat toward the front of the harvester apparatus, the harvester apparatus defining a plant path through the harvester apparatus extending rearwardly from the intake throat, the harvester apparatus comprising:
        a harvester frame having a forward end toward the front of the harvester apparatus and a rearward end toward the rear of the harvester apparatus, the harvester frame including a mounting structure configured to mount on a vehicle and a pair of support structures mounted on the mounting structure;
        a harvester housing mounted on the harvester frame and defining an interior of the harvester apparatus, the harvester housing defining a forward opening generally corresponding to the intake throat through which a rooted plant passes into the interior of the housing and a rearward opening through which the rooted plant passes out of the interior of the housing, the harvester housing having a lower slot through which a portion of the rooted plant passes through as the plant moves into the interior through the forward opening and out of the interior through the rearward opening, the harvester housing including a pair of housing shells oriented in an opposing relationship, each of the housing shells defining a portion of the housing interior, the plant path being defined between the housing shells, each of the housing shells having an inward opening such that the inward openings of the shells are positioned in opposition to each other;
        a pair of stripping assemblies mounted on the harvester frame, the stripping assemblies being at least partially positioned in the interior of the harvester housing, each of the stripping assemblies being mounted on a respective one of the support structures of the harvester frame and being associated with a respective one of the housing shells, each stripping assembly comprising:
            a stripping belt positioned on a side of the plant path such that outer surfaces of the stripping belts of the stripping assemblies are oriented in an opposing relationship across the plant path;
            a plurality of fingers extending outwardly from the outer surface of the stripping belt;
            wherein a portion of the fingers on each of the stripping belts of the stripping assemblies extend into the plant path of the harvester apparatus;
        wherein each of the stripping assemblies comprises a pair of substantially vertically spaced pulleys on which the stripping belt is entrained such that a portion of the outer surface is substantially vertically oriented in opposition to a portion of the outer surface of an other one of the stripping assemblies; and
        wherein the pulleys of the stripping assemblies rotate in a manner such that the fingers on the stripping belts move downwardly along opposite sides of the plant path.

2. The system of claim 1 wherein each of the stripping belts has an active extent with the outer surface being positioned in opposition to the active extent of the stripping belt of an other one of the stripping assemblies, at least a portion of the active extent extending out of the inward opening of a respective one of the shells.

3. The system of claim 2 wherein each of the stripping belts has an inactive extent with at least a portion of the inactive extent of the stripping belt being positioned in a subchamber of the interior of the harvester housing defined by a respective one of the housing shells.

4. The system of claim 1 wherein each of the support structures of the harvester frame are movably mounted on the mounting structure such that the housing shells mounted on the support structures are movable between an operational configuration and a nonoperational configuration, the operational configuration being characterized by leading ends of the housing shells being spaced from each other at a first distance and trailing ends of the housing shells are spaced from each other at a second distance, the first distance being greater than the second distance such that the plant path is wider towards the front of the harvester apparatus and narrower towards the rear of the harvester apparatus, the nonoperational configuration being characterized by the leading ends and the trailing ends of the housing shells being spaced from each other at substantially equal distances.

5. The system of claim 4 wherein the outer surfaces of the stripping belts of the stripping assemblies are oriented to converge toward the rearward opening of the harvester housing and diverge toward the forward opening of the harvester housing when the housing shells are in the operational configuration.

6. The system of claim 1 additionally comprising a collection assembly configured to collect plant parts stripped by the harvester apparatus from the plants, the collection assembly being positioned with respect to the stripping assemblies to collect plant parts falling downwardly upon being acted on by the stripping assemblies.

7. The system of claim 6 wherein the collection assembly comprises a pneumatic collection assembly, the collection assembly producing a negative pressure suction condition in a subchamber of the housing shell of the harvester housing to cause plant parts stripped from plants to enter the subchamber.

8. The system of claim 7 wherein the collection assembly further comprises:
    a collection box in fluid communication with the interior of the harvester housing; and
    a collection fan in fluid communication with the collection box to draw air and plant parts out of the collection box and through the fan.

9. The system of claim 1 wherein the lower slot is at least partially formed from a flexible material configured to conform about a plant stalk passing into the interior of the harvester housing.

10. The system of claim 9 wherein the lower slot is formed by a piece of flexible sheet material extending from each of the housing shells inwardly toward each other, an inward edge of each piece of flexible sheet material defining a side of the lower slot.

11. The system of claim 10 wherein the inward edges of the pieces of flexible sheet material converge together such that a width of the lower slot narrows toward the front of the harvester apparatus.

12. The system of claim 1 wherein the vehicle is a tractor movable in a forward direction across an agricultural field, the harvester apparatus being mounted on the tractor to be at least partially supported by the tractor when moving across the agricultural field.

13. The system of claim 12 additionally comprising a collector wagon removably attachable to the tractor for towing of the wagon by the tractor; and
    wherein the harvester apparatus additionally comprises a collection assembly configured to collect plant parts stripped by the harvester apparatus from the plants and deposit the collected plant parts in the collector wagon.

14. A system for removing parts from plants rooted in an agricultural field while leaving other parts of the plants rooted in the agricultural field, the system comprising:
    a harvester apparatus having a front and a rear and a top and a bottom, the harvester being configured to receive a plant into an intake throat toward the front of the harvester apparatus, the harvester apparatus defining a plant path through the harvester apparatus extending rearwardly from the intake throat, the harvester apparatus comprising:
        a harvester frame having a forward end toward the front of the harvester apparatus and a rearward end toward the rear of the harvester apparatus, the harvester frame including a mounting structure configured to mount on a vehicle and a pair of support structures mounted on the mounting structure;
        a harvester housing mounted on the harvester frame and defining an interior of the harvester apparatus, the harvester housing defining a forward opening generally corresponding to the intake throat through which a rooted plant passes into the interior of the housing and a rearward opening through which the rooted plant passes out of the interior of the housing, the harvester housing having a lower slot through which a portion of the rooted plant passes through as the plant moves into the interior through the forward opening and out of the interior through the rearward opening, the harvester housing including a pair of housing shells oriented in an opposing relationship, each of the housing shells defining a portion of the housing interior, the plant path being defined between the housing shells, each of the housing shells having an inward opening such that the inward openings of the shells are positioned in opposition to each other;
        a pair of stripping assemblies mounted on the harvester frame, the stripping assemblies being at least partially positioned in the interior of the harvester housing, each of the stripping assemblies being mounted on a respective one of the support structures of the harvester frame and being associated with a respective one of the housing shells, each stripping assembly comprising:
            a stripping belt positioned on a side of the plant path such that outer surfaces of the stripping belts of the stripping assemblies are oriented in an opposing relationship across the plant path;
            a plurality of fingers extending outwardly from the outer surface of the stripping belt;
    wherein a portion of the fingers on each of the stripping belts of the stripping assemblies extend into the plant path of the harvester apparatus;
    wherein each of the stripping assemblies comprises a pair of substantially vertically spaced pulleys on which the stripping belt is entrained such that a portion of the outer surface is substantially vertically oriented in opposition to a portion of the outer surface of an other one of the stripping assemblies;
    wherein each of the support structures of the harvester frame is movably mounted on the mounting structure such that the housing shells mounted on the support structures are movable between an operational configuration and a nonoperational configuration, the operational configuration being characterized by leading ends of the housing shells being spaced from each other at a first distance and trailing ends of the housing shells are spaced from each other at a second distance, the first distance being greater than the second distance such that the plant path is wider towards the front of the harvester apparatus and narrower towards the rear of the harvester apparatus, the nonoperational configuration being characterized by the leading ends and the trailing ends of the housing shells being spaced from each other at substantially equal distances.

15. The system of claim 14 wherein the outer surfaces of the stripping belts of the stripping assemblies are oriented to converge toward the rearward opening of the harvester housing and diverge toward the forward opening of the harvester housing when the housing shells are in the operational configuration.

16. A system for removing parts from plants rooted in an agricultural field while leaving other parts of the plants rooted in the agricultural field, the system comprising:
    a harvester apparatus having a front and a rear and a top and a bottom, the harvester being configured to receive a plant into an intake throat toward the front of the harvester apparatus, the harvester apparatus defining a plant path through the harvester apparatus extending rearwardly from the intake throat, the harvester apparatus comprising:
        a harvester frame including a mounting structure configured to mount on a vehicle and a pair of support structures mounted on the mounting structure;
        a harvester housing mounted on the harvester frame and having an interior, the harvester housing having a forward opening generally corresponding to the intake throat through which a portion of a rooted plant passes into the interior of the housing and a lower slot through which the portion of the rooted plant passes through as the plant moves into the interior through the forward opening;
        a pair of stripping assemblies mounted on the harvester frame and at least partially positioned in the interior of the harvester housing, each of the stripping assemblies being mounted on a respective one of the support structures of the harvester frame, each stripping assembly comprising:
            a stripping belt positioned on a side of the plant path such that an outer surface of the stripping belt is substantially vertically oriented in an opposed relationship across the plant path to the stripping belt of the other stripping assembly;
            a plurality of fingers extending outwardly from the outer surface of the stripping belt such that a portion of the fingers on the opposed outer surfaces of the stripping belts extend into the plant path of the harvester apparatus; and pulleys on which the stripping belt is entrained, the pulleys being rotatably mounted on the support structure to rotate in a manner such that the fingers on the stripping belt move downwardly and the fingers of the opposed outer surfaces of the stripping belts moved downwardly along opposite sides of the plant path;

wherein the harvester housing includes a pair of housing shells oriented in an opposing relationship, each of the housing shells defining a portion of the housing interior, the plant path being defined between the housing shells, each of the housing shells having an inward opening such that the inward openings of the shells are positioned in opposition to each other; and wherein each of the support structures of the harvester frame are movably mounted on the mounting structure such that the housing shells mounted on the support structures are movable between an operational configuration and a nonoperational configuration, the operational configuration being characterized by leading ends of the housing shells being spaced from each other at a first distance and trailing ends of the housing shells are spaced from each other at a second distance, the first distance being greater than the second distance such that the plant path is wider towards the front of the harvester apparatus and narrower towards the rear of the harvester apparatus, the nonoperational configuration being characterized by the leading ends and the trailing ends of the housing shells being spaced from each other at substantially equal distances.

17. The system of claim 16 wherein the harvester housing has a rearward opening through which the rooted plant passes out of the interior of the housing; and wherein the opposed outer surfaces of the stripping belts of the stripping assemblies are oriented to converge toward the rearward opening of the harvester housing and diverge toward the forward opening of the harvester housing when the housing shells are in an operational configuration.

18. The system of claim 16 additionally comprising a collection assembly configured to collect plant parts stripped by the harvester apparatus from the plants, the collection assembly being positioned with respect to the stripping assemblies to collect plant parts falling downwardly upon being acted on by the stripping assemblies.

19. The system of claim 18 wherein the collection assembly comprises a pneumatic collection assembly, the collection assembly producing a negative pressure suction condition in a subchamber of the housing shell of the harvester housing to cause plant parts stripped from plants to enter the subchamber.

* * * * *